United States Patent [19]
Todd

[11] Patent Number: 5,581,653
[45] Date of Patent: Dec. 3, 1996

[54] LOW BIT-RATE HIGH-RESOLUTION SPECTRAL ENVELOPE CODING FOR AUDIO ENCODER AND DECODER

[75] Inventor: Craig C. Todd, Mill Valley, Calif.

[73] Assignee: Dolby Laboratories Licensing Corporation, San Francisco, Calif.

[21] Appl. No.: 115,513

[22] Filed: Aug. 31, 1993

[51] Int. Cl.⁶ .................................. G10L 3/02; G10L 9/00
[52] U.S. Cl. ...................... 395/2.38; 395/2.33; 395/2.39; 395/2.34; 395/2.15
[58] Field of Search .................................. 395/2.14, 2.12, 395/2.15, 2.10, 2.74, 2.77, 2.38, 2.39, 2.33, 2.34

[56] References Cited

U.S. PATENT DOCUMENTS

| | | | |
|---|---|---|---|
| 4,142,071 | 2/1979 | Croisier et al. | 395/2.38 |
| 4,464,783 | 8/1984 | Beraud et al. | 395/2.21 |
| 4,550,425 | 10/1985 | Andersen et al. | 395/2.21 |
| 5,109,417 | 4/1992 | Fielder et al. | 381/36 |

FOREIGN PATENT DOCUMENTS

| | | |
|---|---|---|
| 0064119 | 11/1982 | European Pat. Off. . |
| 0193143 | 9/1986 | European Pat. Off. . |
| 4102324 | 6/1992 | Germany . |
| 8804117 | 6/1988 | WIPO . |
| 8810035 | 12/1988 | WIPO . |

OTHER PUBLICATIONS

Rabiner and Schafer, "Digital Processing of Speech Signals", 1978, pp. 282–290.

Presentation material of proposed MIT Audio Coder, MIT Advanced Television and Signal Processing Group, received Feb. 15, 1993.

*Primary Examiner*—Allen R. MacDonald
*Assistant Examiner*—Indranil Chowdhury
*Attorney, Agent, or Firm*—Thomas A. Gallagher; David N. Lathrop

[57] ABSTRACT

A split-band encoder prepares an estimate of an input signal spectral envelope by splitting the input signal into frequency subband signals, generates a scaled representation of the subband signals comprising scaling factors and scaled values, generates a differential coded representation of the scaling factors, and assembles the differential coded representation and scaled values into an encoded signal. The scale factors represent a spectral envelope of the input signal and spectral leakage between filterbank subbands limits the change in value between adjacent scaling factors. This limitation in change can be exploited to reduce the informational requirements of the differential coded representation. Adaptive selection between high- and low-resolution spectral envelopes and adaptive scaling factor reuse are described.

38 Claims, 10 Drawing Sheets

LOW BIT-RATE HIGH-RESOLUTION SPECTRAL ENVELOPE CODING FOR AUDIO ENCODER AND DECODER

TECHNICAL FIELD

The invention relates in general to low bit-rate encoding and decoding of information. More particularly, the invention relates to encoding the spectral envelope of one or more channels of information such as audio or video information.

BACKGROUND

There is considerable interest among those in the fields of audio- and video-signal processing to minimize the amount of information required to represent a signal without perceptible loss in signal quality. By reducing information requirements, signals impose lower information capacity requirements upon communication channels and storage media.

Digital signals comprising signal samples encoded with fewer binary bits impose lower transmission information capacity requirements than digital signals encoded using a greater number of bits to represent the signal. Of course, there are limits to the amount of reduction which can be realized without degrading the perceived signal quality.

The number of bits available for representing each signal sample establishes the accuracy of the signal representation by the encoded signal samples. Lower bit rates mean that fewer bits are available to represent each sample; therefore, lower bit rates imply greater quantizing inaccuracies or quantizing errors. In many applications, quantizing errors are manifested as quantizing noise, and if the errors are of sufficient magnitude, the quantizing noise will degrade the subjective quality of the encoded signal.

SPLIT-BAND CODING

Various "split-band" coding techniques attempt to reduce information requirements without any perceptible degradation by exploiting various psycho-perceptual effects. In audio applications, for example, the human auditory system displays frequency-analysis properties resembling those of highly asymmetrical tuned filters having variable center frequencies and bandwidths that vary as a function of the center frequency. The ability of the human auditory system to detect distinct tones generally increases as the difference in frequency between the tones increases; however, the resolving ability of the human auditory system remains substantially constant for frequency differences less than the bandwidth of the above mentioned filters. Thus, the frequency-resolving ability of the human auditory system varies according to the bandwidth of these filters throughout the audio spectrum. The effective bandwidth of such an auditory filter is referred to as a "critical bandwidth." A dominant signal is more likely to mask the audibility of other signals anywhere within a critical bandwidth than it is likely to mask other signals at frequencies outside that critical bandwidth. See generally, the *Audio Engineering Handbook*, K. Blair Benson ed., McGraw-Hill, San Francisco, 1988, pages 1.40–1.42 and 4.8–4.10.

Audio split-band coding techniques which divide the useful signal bandwidth into frequency bands with bandwidths no wider than the critical bandwidths of the human auditory system can better exploit psychoacoustic effects than wider band techniques. Such digital split-band coding techniques comprise dividing the signal bandwidth with a filter bank, quantizing the signal passed by each filter band using just enough bits to render quantizing noise inaudible, and reconstructing a replica of the original signal with an inverse filter bank. Two such techniques are subband coding and transform coding. Subband and transform encoders can reduce transmitted information in particular frequency bands where the resulting quantizing noise is psychoacoustically masked by neighboring spectral components without degrading the subjective quality of the encoded signal.

Subband encoders may use various analog and/or digital techniques to implement a filter bank. In a digital embodiment of such encoders, an input signal comprising signal samples is passed through a bank of digital filters and each "subband signal" passed by a respective filter in the filter bank is downsampled according to the bandwidth of that subband's filter. Each subband signal comprises samples which represent a portion of the input signal spectrum. Digital subband decoders recover a replica of the input signal by upsampling the downsampled subband signals and merging the upsampled subband signals into an output signal. This process is one example of a signal synthesis process referred to herein as the application of an inverse filter bank. Digital coding techniques may be used with analog filter banks by sampling and quantizing the subband signals passed by the filter bank.

Transform encoders may use any of various so-called time-domain to frequency-domain transforms to implement a bank of digital filters. An input signal comprising signal samples is segmented into "signal sample blocks" prior to filtering. Individual coefficients obtained from the transform, or two or more adjacent coefficients grouped together, define "subbands" having effective bandwidths which are sums of individual transform coefficient bandwidths. Transform decoders recover a replica of the input signal by applying to the transform coefficients an inverse filter bank implemented by complementary inverse transforms or so-called frequency-domain to time-domain transforms.

Throughout the following discussion, the term "split-band coding" and the like refers to subband encoding and decoding, transform encoding and decoding, and other encoding and decoding techniques which operate upon portions of the useful signal bandwidth. The term "subband" refers to these portions of the useful signal bandwidth, whether implemented by a true subband coder, a transform coder, or other technique.

The term "subband signal" refers to the split-band filtered representation of the spectral energy within a respective subband. The term "subband signal block" refers to the subband signals for all subbands across the useful signal bandwidth within a given interval or block of time. For subband coders implemented by a digital filter bank, a subband signal block comprises the set of samples for all subband signals over a given time interval. For transform coders, a subband signal block comprises the set of all transform coefficients corresponding to a signal sample block.

As discussed above, many split-band encoders utilizing psychoacoustic principles provide high-quality encoding at low bit rates by applying a filter bank to an input signal to generate subband signals, quantizing each subband signal using a number of bits allocated to that signal such that resulting quantizing noise is inaudible due to psychoacoustic masking effects, and assembling the quantized information into a form suitable for transmission or storage.

A complementary split-band decoder recovers a replica of the original input signal by extracting quantized information from an encoded signal, dequantizing the quantized information to obtain subband signals, and applying an inverse filter bank to the subband signals to generate the replica of the original input signal.

Throughout this discussion more particular mention is made of split-band audio coding, but the discussion pertains more generally to coding applications which reduce encoded signal information requirements by exploiting signal irrelevancy and redundancy. Signal irrelevancy pertains to signal components which are not needed to achieve a desired level of coding performance such as, for example, perceived fidelity of an encoded signal. Signal redundancy pertains to signal components which can be recreated from other signal components. Split-band audio coding and split-band video coding using psycho-perceptual effects are only two examples of coding applications to which the principles and concepts discussed herein apply.

Many split-band coders convey subband signals using a "scaled representation" to extend the dynamic range of encoded information represented by a limited number of bits. A scaled representation comprises one or more "scaling factors" associated with "scaled values" corresponding to elements of the encoded subband signals. Many forms of scaled representation are known. By sacrificing some accuracy in the scaled values, even fewer bits may be used to convey information using a "block-scaled representation." A block-scaled representation comprises a group or block of scaled values associated with a common scaling factor.

The number of bits allocated to quantize each subband signal must be available to the decoder to permit accurate dequantization of the subband signals. A "forward-adaptive" encoder passes explicit allocation information or "side information" to a decoder. A "backward-adaptive" encoder passes implicit rather than explicit allocation information, allowing a decoder to determine allocation information from the encoded signal itself.

In many embodiments, backward-adaptive encoders pass implicit allocation information in the form of an estimate of the spectral shape of the information represented by the encoded signal. The estimate often comprises block scaling factors corresponding to frequency subbands.

In one embodiment, a backward-adaptive audio encoder prepares a piecewise-linear estimate of the input signal spectral envelope, establishes allocation information by applying an allocation function to the envelope estimate, scales block of audio information using elements of the envelope estimate as scaling factors, quantizes the scaled audio information according to the established allocation information, and assembles the quantized information and the envelope estimate into an encoded signal. A backward-adaptive decoder extracts the envelope estimate and quantized information from the encoded signal, establishes allocation information by applying to the envelope estimate the same allocation function as that used by the encoder, dequantizes the quantized information, and reverses the scaling of the audio information. Two examples of a backward-adaptive encoder/decoder system using spectral envelope estimates for scaling and allocation are disclosed in U.S. Pat. Nos. 4,790,016 and 5,109,417, which are incorporated herein by reference in their entirety.

On the one hand, it is desirable to use smaller block with fewer scaled values to improve the allocation process. Smaller blocks increase the number of scaling factors across the useful signal bandwidth, thereby increasing the resolution of the spectral envelope estimate which is available to the allocation function. By using a higher-resolution spectral envelope estimate, an allocation function can apply more accurate psychoacoustic models to each scaled value to establish more optimum allocation information.

On the other hand, it is desirable to use larger blocks with more scaled values to reduce the number of bits required to represent the scaling factors in the encoded signal. Larger blocks decrease the number of scaling factors across the useful signal bandwidth, thereby decreasing the resolution of the spectral envelope estimate. Although this reduces the number of bits required to convey the scaling factors, it is generally not desirable to use blocks representing subbands which are wider than a critical bandwidth. As discussed above, coders using subbands having bandwidths no wider than the critical bandwidths are better able to exploit psychoacoustic effects than can wider band techniques.

DISCLOSURE OF INVENTION

It is an object of the present invention to provide for low bit-rate coding of high-resolution spectral envelope estimates.

According to the teachings of the present invention in one embodiment of an encoder, a filter bank splits an input signal into a plurality of subband signals, a scaler generates scaled representations of the subband signals comprising scaling factors and scaled values, a differentiator generates a differential coded representation of the scaling factors, and a formatter assembles the scaled values and scaling factor information comprising the differential coded representation into an encoded signal having a format suitable for transmission or storage. The differential coded representation comprises scaling factor differentials across the input signal bandwidth.

In a variation of the encoder embodiment just described, the scaler generates scaled representations comprising scaling factors having values which are adjusted when necessary to restrict the range of differentials between scaling factors.

In another variation, the scaler determines whether the information requirements of the encoded signal can be reduced by using a previous set of scaling factors to generate the scaled representation. When the information requirements can be reduced, the scaler generates scaled representations using the previous scaling factors; the differentiator does not need to generate the differential coded representation because the formatter assembles into an encoded signal scaling factor information comprising a "reuse indicator" instead of a differential coded representation.

According to the teachings of the present invention in one embodiment of a decoder, a deformatter extracts from an encoded signal a plurality of scaled values and scaling factor information comprising a differential coded representation of scaling factors, an integrator generates scaled representations in response to the extracted scaled values and the differential coded representation, an inverse scaler generates subband signals in response to the scaled representations, and an inverse filter bank generates an output signal in response to the subband signals.

In a variation of the decoder embodiment just described, the deformatter extracts scaling factor information comprising a reuse indicator from the encoded signal. The integrator does not need to generate the scaled representations because the inverse scaler generates subband signals from the scaled values using the scaling factors derived previously from the encoded signal.

The present invention is not restricted to these embodiments. The various features of the present invention and its preferred embodiments may be better understood by referring to the following discussion and the accompanying drawings. The contents of the following discussion and the drawings are set forth as examples only and should not be understood to represent limitations upon the scope of the present invention.

MODES FOR CARRYING OUT THE INVENTION

Basic Encoder/Decoder Structure

Figure 1:
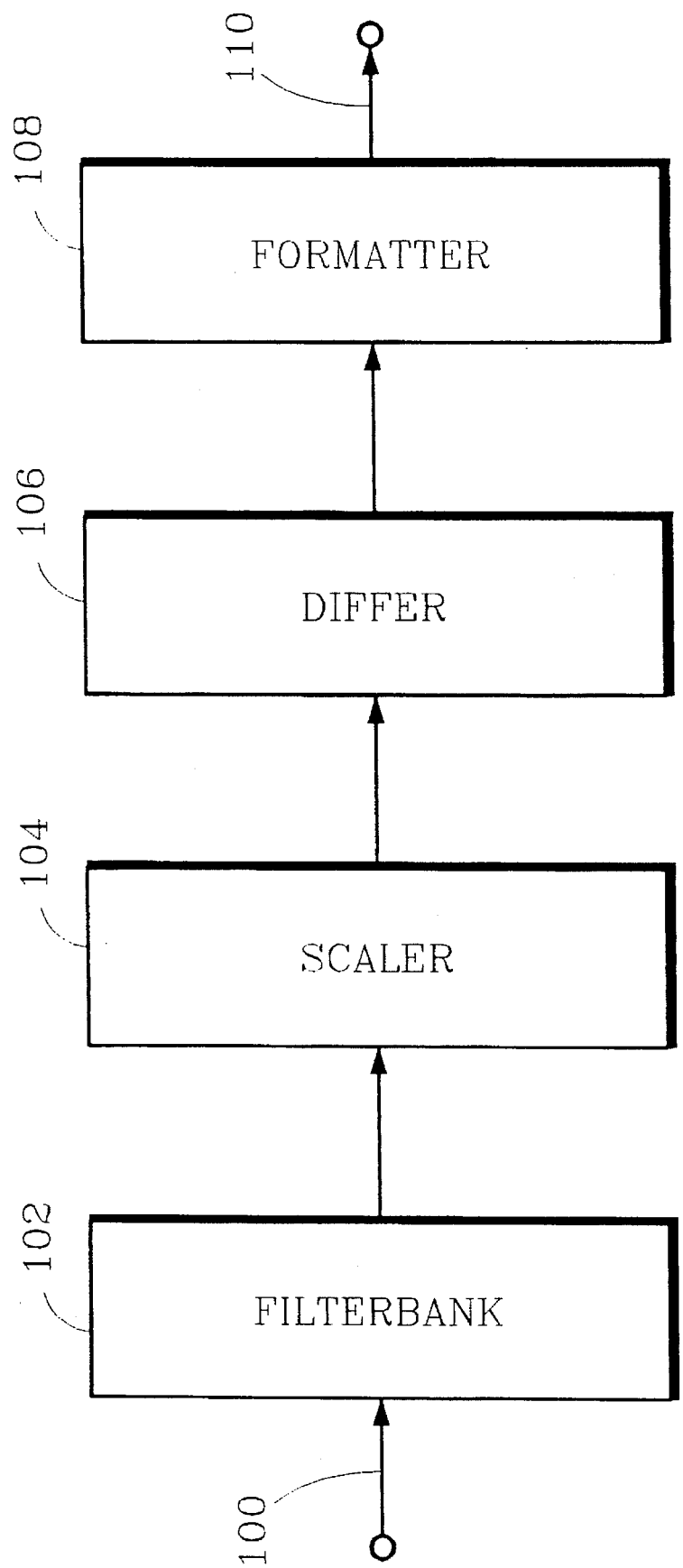
FIG. 1 is a block diagram illustrating one embodiment of a split-band encoder incorporating various aspects of the present invention.

FIG. 1 illustrates one embodiment of a split-band encoder incorporating various aspects of the present invention. Filterbank 102 generates subband signals in response to an input signal received from path 100. Scaler 104 generates a scaled representation of the subband signals received from filterbank 102; the scaled representation comprises scaling factors associated with one or more scaled values. Differentiator 106 generates a differential coded representation of the scaling factors and passes the differential coded representation and the scaled values to formatter 108. Formatter 108 generates along path 110 an encoded signal which comprises the scaled values and the differential coded representation.

Figure 3:
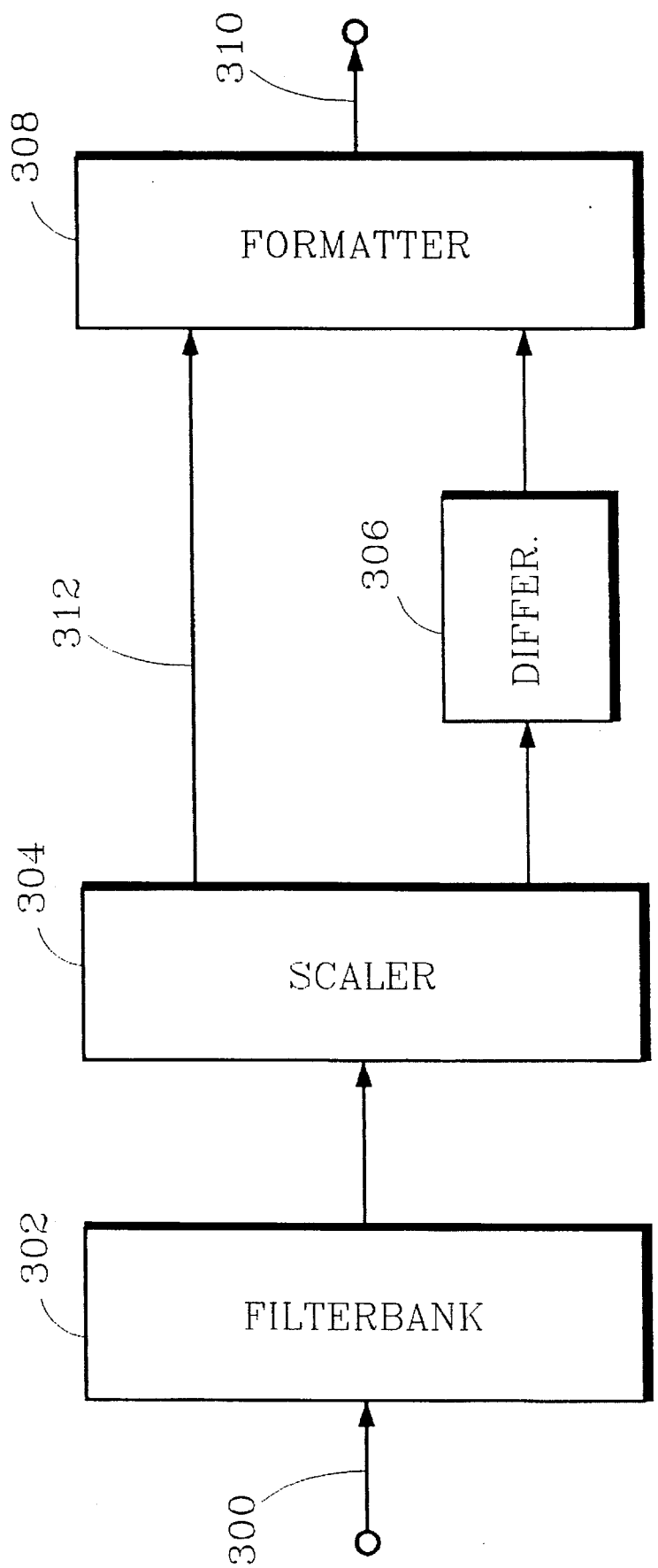
FIG. 3 is a block diagram illustrating another embodiment of a split-band encoder incorporating various aspects of the present invention.

FIG. 3 illustrates another embodiment of a split-band encoder which is similar in structure to the embodiment illustrated in FIG. 1. In contrast to the embodiment illustrated in FIG. 1, scaler 304 passes some but not all scaling factors to differentiator 306. The remaining scaling factors are passed along path 312 to formatter 308. It is a matter of mere design choice whether a particular encoder implementation passes the scaled values to deformatter 308 along path 312, through differentiator 306, and/or along another path not shown. Formatter 308 generates an encoded signal comprising the scaled values, the differential coded representation, and the scaling factors not included in the differential coded representation.

Figure 2:
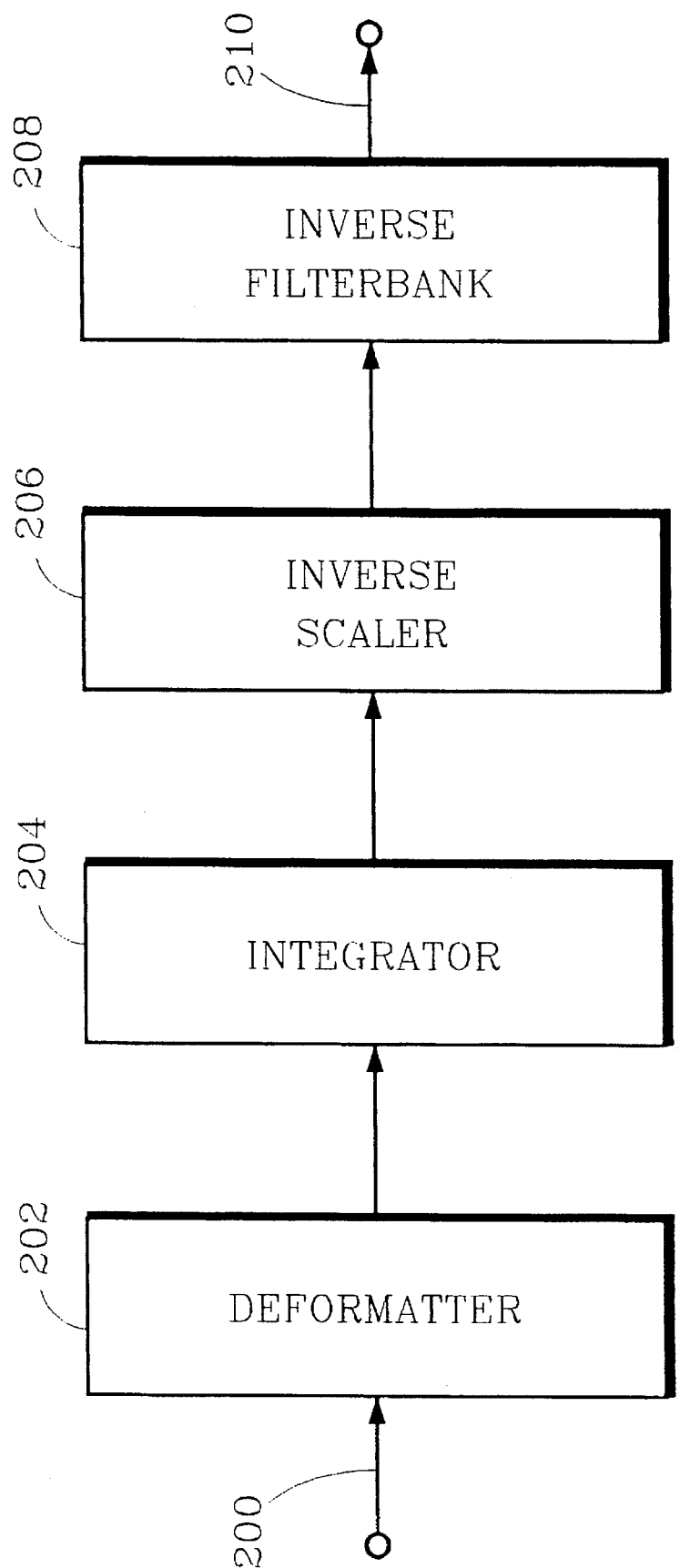
FIG. 2 is a block diagram illustrating one embodiment of a split-band decoder incorporating various :aspects of the present invention.

FIG. 2 illustrates one embodiment of a split-band decoder incorporating various aspects of the present invention. Deformatter 202 extracts scaled values and a differential coded representation of scaling factors from an encoded signal received from path 200. Integrator 204 generates a scaled representation of subband signals comprising scaling factors associated with one or more scaled values; the scaling factors are generated in response to the differential coded representation received from deformatter 202. Inverse scaler 206 generates subband signals in response to the scaled representation received from integrator 204. Filterbank 208 generates along path 2 10 an output signal by applying an inverse filter bank to the subband signals received from inverse scaler 206.

Figure 4:
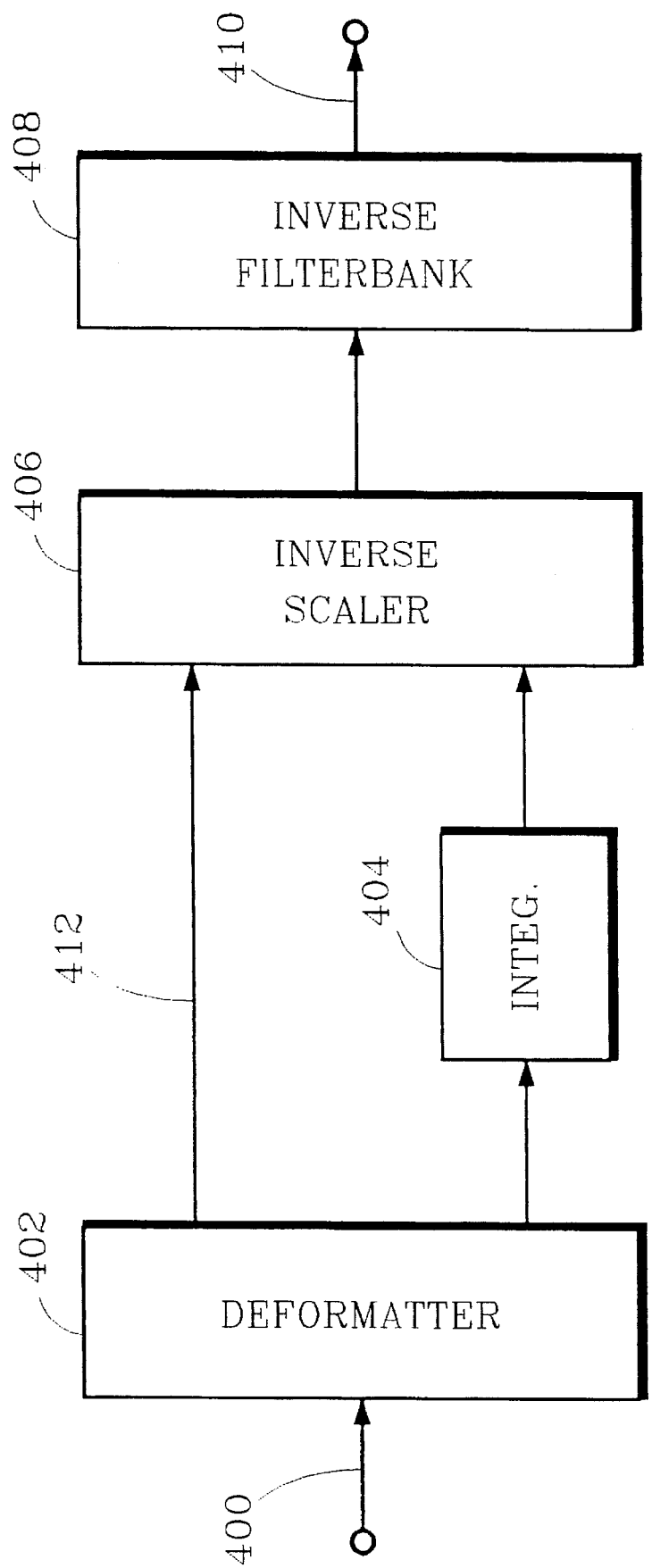
FIG. 4 is a block diagram illustrating another embodiment of a split-band decoder incorporating various aspects of the present invention.

FIG. 4 illustrates another embodiment of a split-band decoder which is similar in structure to the embodiment illustrated in FIG. 2. In contrast to the embodiment illustrated in FIG. 2, deformatter 402 extracts scaled values, a differential coded representation, and scaling factors not included in the differential coded representation from an encoded signal received from path 400. The differential ceded representation is passed to integrator 404. The scaling factors not included in the differential coded representation are passed along path 412 to inverse scaler 406. It is a matter of mere design choice whether a particular decoder implementation passes the scaled values to inverse scaler 406 along path 412, through integrator 404, and/or along another path not shown.

The diagrams shown in FIGS. 1 and 3 illustrate basic structures for an encoder incorporating various aspects of the present invention. They do not expressly show any coding component which reduces the information requirements of the encoded signal. In audio coding systems, for example, a component employing various coding techniques may exploit psychoacoustic principles to minimize the audible effects of reducing the information requirements of the encoded signal. The present invention is well suited for use with coding components such as those used in many audio coding and video coding applications, but such a coding component is not required to practice the present invention.

Information reduction coding may be incorporated into the embodiment illustrated in FIG. 1 in many ways. For example, the coding function may be performed within any one, or within any combination of filterbank 102, scaler 104, differentiator 106 and formatter 108. As another example, the coding process may be performed by a component not shown which incorporates scaler 104 and differentiator 106. Similar examples also apply to the embodiment illustrated in FIG. 3.

Similarly, FIGS. 2 and 4 illustrate basic structures for a decoder incorporating various aspects of the present invention. They do not expressly show any decoding component which reverses the effects of a process which reduced information requirements of the encoded signal. Information reduction decoding may be incorporated into the embodiment illustrated in FIG. 2 in many ways. For example, the decoding function may be performed within any one, or within any combination of deformatter 202, integrator 204, inverse scaler 206 and inverse filterbank 208. As another example, the decoding process may be performed by a component not shown which incorporates integrator 204 and inverse scaler 206. Similar examples also apply to the embodiment illustrated in FIG. 4.

The embodiments illustrated in FIGS. 1–4 do not include various components which are often necessary in many practical applications. For example, practical embodiments of an encoder often apply a low-pass filter (LPF) to limit the bandwidth of the input signal and prevent aliasing. Such practical considerations do not fall within the scope of the present invention and are not discussed in detail herein. Additional details of implementation may be obtained from U.S. Pat. Nos. 5,109,417, for example, which is cited above.

Filterbank

Various digital and analog techniques may be used to implement the encoder filter bank. If analog techniques are used, the subband signals passed by the encoder filterbank may be sampled and quantized to obtain digital signals for subsequent coding operations. No particular technique is critical to the practice of the present invention but digital techniques may often be implemented less expensively.

Digital techniques include nonrecursive or so-called Finite Impulse Response (FIR) filters and recursive or so-called Infinite Impulse Response (IIR) filters. See generally, Hamming, *Digital Filters*, Englewood Cliffs, N.J., 1989, pp. 124–270. FIR filters may be implemented using techniques such as polynomial filters or transforms such as the Fourier transform. Examples of specific filter designs include various Fourier transforms such as the Discrete Fourier Transform (DFT) and Discrete Cosine Transform (DCT), the Quadrature Mirror Filter (QMF) which is discussed in Esteban and Gatand, "Application of Quadrature Mirror Filters to Split Band Voice Coding Schemes," *Proc. ICASSP*, May 1977, pp. 191– 195, and the Time-Domain Aliasing Cancellation CYDAC) filter which is discussed in Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161.

Although the use of subbands with bandwidths commensurate with the critical bandwidths allows greater exploitation of psychoacoustic effects than does wider band techniques, application of the teachings of the present invention are not so limited. The term "subband" and the like as used herein should be understood as one or more frequency bands within the useful bandwidth of an input signal.

Scaler

Many split-band coders use a scaled representation to extend the dynamic range of encoded information represented by a limited number of bits. The scaling factors themselves also provide a basis from which an estimate of the spectral envelope may be obtained. The estimated spectral envelope may be used in backward-adaptive coding systems to convey adaptive bit allocation information.

A split-band encoder which forms an estimate of the spectral envelope from scaling factors may use a combination of individual and block scaling. For example, a scaled representation may use scaling factors associated with individual scaled values to represent low-frequency subband signals because the critical bandwidths for low frequencies are narrow, and use scaling factors associated with a block of two or more scaled values to represent high-frequency subband signals because the critical bandwidths for high frequencies are wider.

Block scaling in accordance with critical bandwidths is attractive in many low bit-rate coding systems because fewer scaling factors are required to convey the allocation information as compared to individual scaling. Block scaling reduces the information requirement of the scaling factors in an encoded signal, but it also reduces the resolution of the estimated spectral envelope and tends to increase the information requirements of the scaled values. This effect is discussed in more detail below.

One example of an individual-scaled representation commonly known as floating-point comprises an exponent (the scaling factor) and a mantissa (the scaled value). Many forms of floating-point are known. In one form, the exponent represents the power of two of a multiplier used to "normalize" the mantissa, or scale the magnitude of the mantissa into a range between 0.5 and 1.0; a multiplier with the reciprocal power of two is used to obtain the true quantity from the normalized mantissa. For example, a 7-bit floating-point number, which comprises a 4-bit exponent equal to 3 and a normalized 3-bit mantissa in two's complement form expressing a scaled value equal to 0.75, represents the quantity $0.75 \times 2^{-3}$ or 0.09375. The exponent is used to scale the mantissa, thereby increasing the range of quantities which can be represented by a limited number of bits.

One example of a block-scaled representation is commonly known as block-floating-point (BFP) which comprises a block of mantissas (the scaled values) associated with a common exponent (the block scaling factor). In one embodiment similar to that described above, the block exponent represents the power of two of a multiplier which normalizes the mantissa corresponding to the quantity having the greatest magnitude in the block. The other mantissas in the block are scaled according to the block exponent and may not be normalized because they may have scaled values with magnitudes less than 0.5. For example, a BFP representation comprising a 4-bit block exponent, which is equal to 4, associated with three scaled 3-bit mantissas, which are equal to 0.5, 0.75 and –0.25, represents the numeric quantities 0.03125, 0.046875 and –0.015625.

Another example of a block-scaled representation comprises a block of scaled values associated with a linear multiplier (the block scaling factor). The block multiplier is equal to the magnitude of the largest quantity in the block and the quantifies in the block are scaled by dividing each quantity by the scaling factor. The true quantities are obtained by multiplying each scaled value by the scaling factor. For example, three scaled values, which are equal to –0.75, 1.00 and 0.50, associated with a block multiplier, which is equal to 0.1875, represent the quantities –0.140625 (–0.75×0.1875), 0.1875 and 0.09375, respectively.

An embodiment of an encoder incorporating various aspects of the present invention may use any of a wide variety of scaling functions S(q). For example, the scaling function S(q) may be linear, logarithmic, or trigonometric; however, the scaling function should provide for a complementary inverse scaling function $S^{-1}(q)$ which can be applied in the decoder to recover an approximation of the true quantities from the scaled values.

Various design criteria for a particular encoder/decoder application will often influence the choice of the scaling function. For example, backward-adaptive split-band coding systems may use exponents in a floating-point representation similar to that discussed above to implicitly convey bit allocations made according to subband signal amplitude. A unit increase in exponent value represents an approximate decrease in amplitude of one-half or a change of −6 dB (20 $\log_{10} 0.5$) for the quantity represented by the floating-point number; therefore, such a floating-point representation may be a good design choice for backward-adaptive coding systems which allocate one additional bit for an increase in amplitude of 6 dB or some multiple such as 18 dB.

Differentiator

Figure 5:
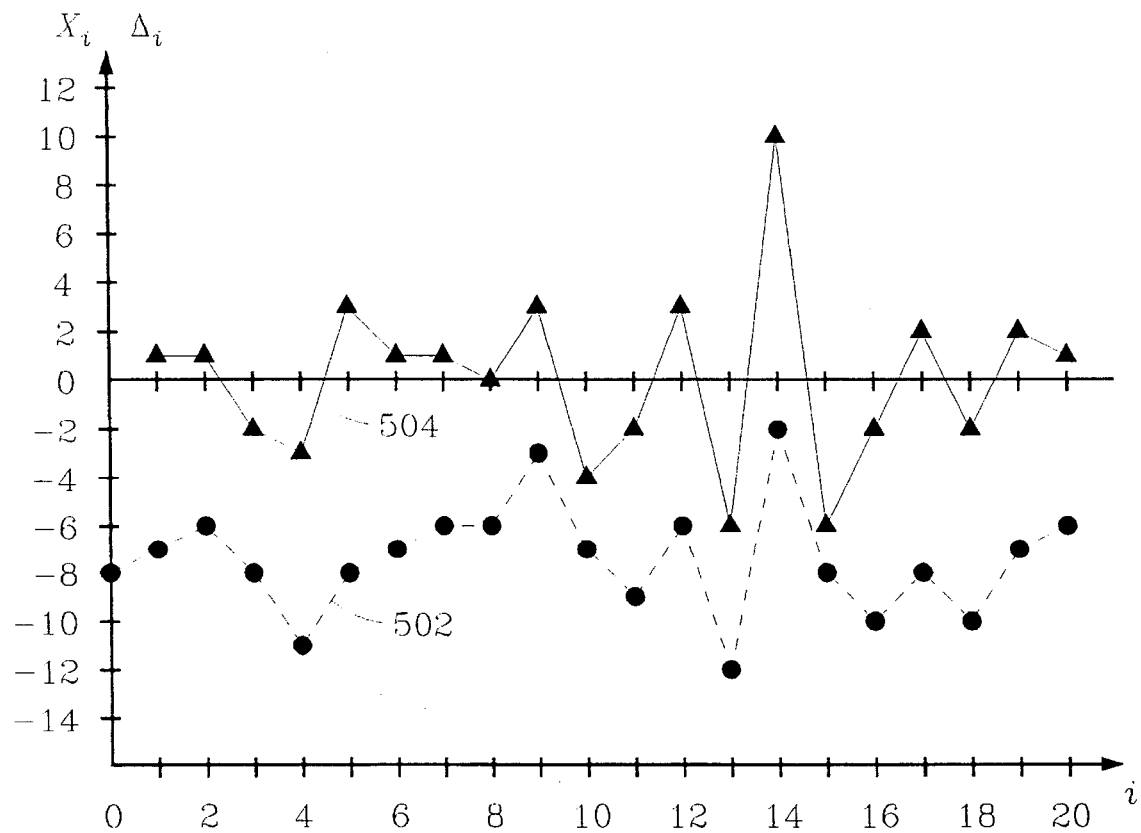
FIG. 5 is a hypothetical graphical representation of differential coded scaling factors.

The differentiator generates a differential coded representation of one or more of the scaling factors by establishing the difference between scaling factors across the spectrum. FIG. 5 illustrates two sets of points representing two sets of hypothetical values. The points connected by broken line 502 represent a set of scaling factors such as floating-point exponents, for example, for subband signals in a subband signal block. Continuing the floating point examples discussed above, the exponents $X_i$ are plotted on the graph as negative numbers so that larger values correspond to larger amplitude signals. In the example shown, exponent $X_0$ has a value of 8 but is plotted as −8, and exponent $X_1$ has a value of 7 but is plotted as −7. Throughout the following discussion, the negative values as plated will be referred to as the value of an exponent $X_i$. The quantity represented by the floating-point number comprising exponent $X_1$ is approximately twice as large as the quantity represented by the floating-point number comprising exponent $X_0$. The same set of exponents are illustrated in FIGS. 6–10.

The points connected by broken line 504 represent the difference between successive exponents. For example, the first point $\Delta_1$ having a value of one indicates that exponent $X_1$ is one larger than exponent $X_0$. The third point $\Delta_3$ having a value of negative two indicates that exponent $X_3$ is two less than exponent $X_2$. There is no differential point corresponding to exponent $X_0$ because this exponent is the base from which the differential values are determined.

Many variations in the process for generating the differential coded representation are possible. For example, the differential function $D(i)$ may be linear, logarithmic, or trigonometric; however, the differential function should provide for a complementary integral function $D^{-1}(i)$ which can be applied in the decoder to recover the scaling factors from the differential coded representation. In the example discussed above, the differential function $D(i)=X_i-X_{i-1}$ is a linear function but, because of the nature of floating-point exponents, the differential varies approximately as the exponential of the underlying signal amplitude.

A particular embodiment of an encoder may apply the differential function to all scaling factors, or it may apply the function only to scaling factors associated with adaptively selected subband signals. The adaptive selection may be made so as to obtain an optimum reduction in the information requirements of the encoded signal. For example, referring to FIG. 5, more bits may be required to convey a differential coded representation of exponents $X_{13}$ to $X_{20}$ than would be required to convey the exponents themselves. In this instance, an encoder could select only exponents $X_1$ to $X_{12}$ for differential coding and pass an indication of this selection in the encoded signal.

For some embodiments, the differential function need not distinguish between block scaling factors and scaling factors associated with a single scaled value. In other embodiments such as some of those discussed below which adapt the differential function to achieve the greatest possible reduction in information requirements, the distinction may be important.

Formatter

The formatting process generates an encoded signal by assembling the scaled values, differential coded representation, a base value, and possibly one or more scaling values into a form which is suitable for transmission or storage. One scaling factor can serve as the base value from which the relative values in the differential coded representation are determined. In many practical embodiments, additional information such as error detection/correction codes (EDC), frame synchronization codes, and/or database retrieval keys are also assembled into the encoded signal. The formatting process used in a particular embodiment and the format of the encoded signal resulting from the formatting process are not critical to the practice of the present invention.

Deformatter

The deformatter reverses the effects of the formatting process by extracting scaled values, a differential coded representation, a base value, and possibly one or more scaling factors from an encoded signal. In many practical embodiments, EDC and frame synchronization codes are used to correctly interpret the received encoded signal and, where possible, to detect and correct errors introduced during transmission or storage/retrieval. The deformatting process used in a particular embodiment is not critical to the practice of the present invention.

Integrator

The integrator is a complementary function to that used to generate the differential coded representation in the encoder. Referring to the example discussed above, for example, a scaling factor may be recovered from the differential coded representation and a base value using the relation $$X_n = X_{n-1} + \Delta_n = X_0 + \sum_{i=1}^{n} \Delta_i \text{ for } n \geq 1,$$

where $\Delta_i = X_i - X_{i-1}$ for $i > 1$, and $X_0$ = the base value.

In general, the integral function $D^{-1}(i)$ is the inverse of the differential function $D(i)$ such that the scaling factor $X_i = D^{-1}\{D(i)\}$.

If the encoded signal was prepared by an encoder which differentially codes adaptively selected scaling factors, an indication of the selection is extracted from the encoded signal by the deformatter and is used to adapt the integral function to derive only the appropriate scaling factors.

Inverse Scaler

The inverse scaling function is a complementary function to that used to obtain the scaled representation in the encoder. Referring to the floating-point representation discussed above, for example, a normalized 3-bit mantissa equal to $0.11_2$ represents the scaled value 0.75 in two's complement form. The true quantity represented by this normalized mantissa, associated with an exponent having a value equal to 3, is $0.75 \times 2^{-3}$ or 0.09375. In this example, inverse scaling may be implemented by logically shifting the bits of the binary mantissa to the right a number times equal to the value of the exponent. The inverse scaling process for BFP representations is similar.

In general, the inverse scaling function $S^{-1}(q)$ is the inverse of the scaling function $S(q)$ such that the true quantity $q \cong S^{-1}\{S(q)\}$. Strict equality is not always expected because use of the scaling function may result in the loss of some accuracy.

Inverse Filterbank

No particular technique for implementing the inverse filter bank is critical to the practice of the invention. Many techniques such as QMF and TDAC provide for critical sampling and, in theory, permit exact reconstruction of the original input signal by the inverse filter bank. Although these properties are often very desirable characteristics for practical embodiments of an encoder/decoder system, they are not essential to the practice of the present invention.

Alternate Embodiments

The following discusses various alternative embodiments to the basic embodiments discussed above. Examples are used to describe aspects of the present invention; however, the present invention is not limited to the specific examples cited. Several of these alternatives pertain to coding techniques which attempt to reduce the information requirements of the encoded signal without perceptibly degrading the encoded signal.

Differential Range

Information requirements of the encoded signal may sometimes be reduced by limiting the range of the differentials generated by the differential function D(i). In one embodiment of an encoder incorporating aspects of the present invention, quantities are represented by floating-point numbers comprising 4-bit exponents. Two quantities expressed in this representation have exponents which may differ by an amount in the range from −15 to 15. A conventional binary representation of a differential with this range requires five bits, but only four bits are required to convey the exponents themselves. By restricting the differentials to the range from −1 to 1, for example, only two bits are required to convey the differentials using a conventional binary representation. This results in a savings of two bits per differential.

The differential between exponents of successive floating-point numbers can be restricted to any arbitrary range. Differentials can be restricted by adjusting the exponent of the smaller magnitude quantity and scaling the associated mantissa accordingly. This process is described below using the notation $\pm 0.nnn_2$ E xx to represent a binary fraction mantissa $\pm 0.nnn_2$ in two's complement form associated with a decimal exponent xx.

For example, a quantity $Q_2 = -0.09375$ may be expressed as the floating-point number $-0.11_2$ E 3, and a successive quantity $Q_2 = 0.001953125$ may be expressed as the floating-point number $+0.1_2$ E 8. The exponent differential between the two quantities is +5. By adjusting the exponent of quantity $Q_2$ and rescaling the associated mantissa such that $Q_2$ is expressed as $+0.000012$ E 4, for example, the exponent differential is reduced to +1.

Figure 6:
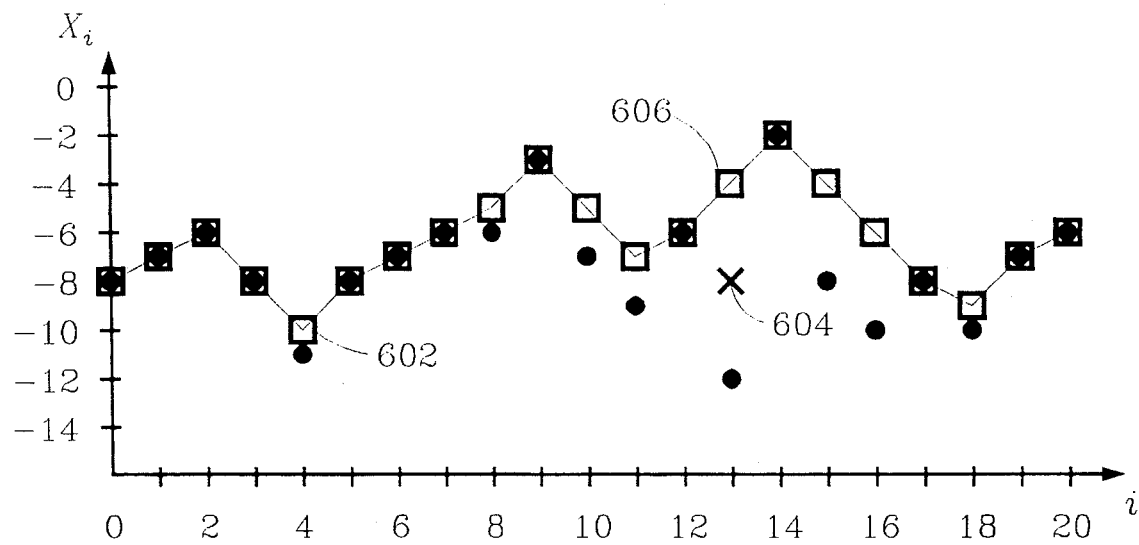
FIG. 6 is a hypothetical graphical representation of scaling factors and corresponding adjusted values which restrict the range of differentials.

FIG. 6 illustrates the results of adjusting exponents to restrict the differentials to the range from −2 to 2. The circles represent the values of exponents before adjustment and are the same as those shown in FIG. 5. The squares represent the values of exponents after adjustment. No adjustment is required for exponents $X_1$ to $X_3$ because the corresponding differentials $\Delta_1$ to $\Delta_3$ are already within the restricted range from −2 to 2. The exponent $X_4$ is adjusted to a new value represented by square 602 to reduce the magnitude of the original differential $\Delta_4$ from −3 to −2. Similar adjustments are also made to exponents $X_8$, $X_{10}$, $X_{11}$, $X_{15}$, $X_{16}$ and $X_{18}$.

Exponent $X_{13}$ is also adjusted but this adjustment is influenced by two considerations. First, an initial adjustment to the exponent reduces the magnitude of the original differential $\Delta_{13}$ between exponents $X_{12}$ and $X_{13}$ from −6 to −2. The exponent value which results from this adjustment is represented by cross symbol 604. Second, an additional adjustment is required because the remaining differential $\Delta_{14}$ between exponents $X_{13}$ and $X_{14}$ is too large. This additional adjustment reduces the remaining differential from +6 to +2. The exponent value $X_{13}$ which results from the second adjustment is represented by square 606. The resulting differential $\Delta_3$ between exponents $X_{12}$ and $X_{13}$ is +2, therefore no further adjustments are required. If the differential between exponents $X_{12}$ and $X_{13}$ was too large, exponent $X_{12}$ would be increased to reduce the differential. If exponent $X_{12}$ was increased, then the differential between exponents $X_{11}$ and $X_{12}$ would be examined to determine if further adjustments to exponent $X_{11}$ were required to ensure the differential is not too large. These further adjustments would be made to each preceding exponent until either the preceding differential is not too large or the first exponent $X_0$ is processed.

Figure 12:
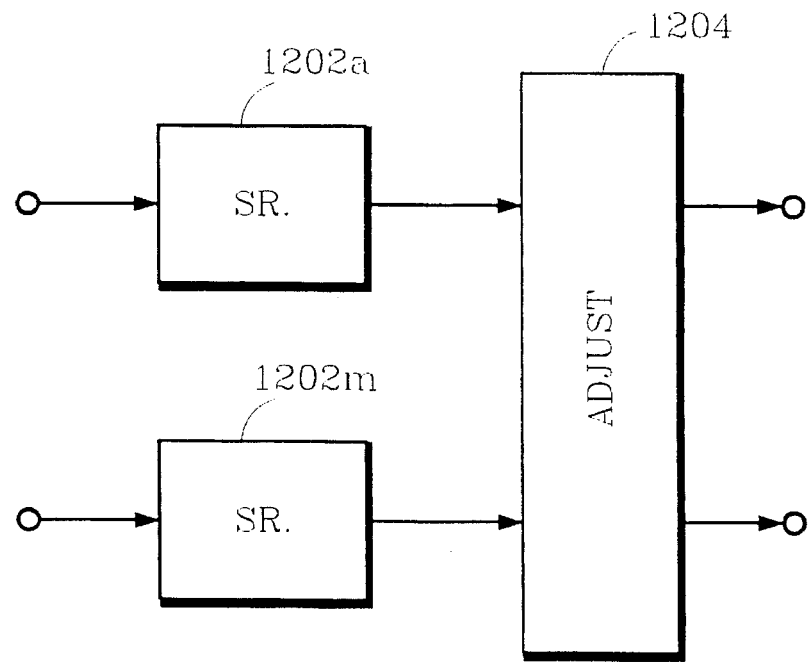
FIG. 12 is a block diagram illustrating one embodiment of a portion of a scaler which limits the range of scaling factor differentials.

FIG. 12 illustrates in functional form one embodiment of a portion of scaler 104 which limits the range of scaling factor differentials. SR 1202a through SR 1202m each represent the generation of a scaled representation of a respective subband signal. Adjust 1204 examines the magnitude of the differences between scaling factors and adjusts the scaled representations such that these differentials do not exceed a limit.

The following program fragment represents one way in which the adjustments may be carried out. A wide variety of alternative ways are possible.

```
(01)    for i from 1 to 20
(02)        set Δᵢ = Xᵢ − Xᵢ₋₁
(03)    endfor
(04)    for i from 1 to 20
(05)        if |Δᵢ| > 2 then
(06)            if Δᵢ < 0 then
(07)                set k = −2 − Δᵢ
(08)                set Xᵢ = Xᵢ + k
(09)                set Δᵢ = −2
(10)                set Δᵢ₊₁ = Δᵢ₊₁ − k
(11)            else
(12)                set j = i
(13)                while Δⱼ > 2 and j > 0
(14)                    set k = Δⱼ − 2
(15)                    set Xⱼ₋₁ = Xⱼ₋₁ + k
(16)                    set Δⱼ = 2
(17)                    set Δⱼ₋₁ = Δⱼ₋₁ + k
(18)                    set j = j − 1
(19)                endwhile
(20)            endif
(21)        endif
(22)    endfor
```

Lines (01) to (03) calculate the exponent differentials for exponents $X_1$ to $X_{20}$. The variable $\Delta_i$ represents the differential between exponent $X_{i-1}$ and exponent $X_i$. Lines (04) to (22) adjust the exponents to restrict the exponent differentials to a range from −2 to 2. Line (05) determines whether the differential $\Delta_i$ is within the restricted range. If it is, line (04) advances the index i to the next differential and reiterates the process performed in lines (05) to (21) until all differentials have been processed. If line (05) determines that differential is not within the restricted range, then an adjustment to one or more exponents is needed. Line (06) determines whether the differential is too large or too small. If the differential is too small, lines (07) to (10) make the needed adjustments, otherwise lines (12) to (18) make the needed adjustments.

If the differential is too small, line (07) determines the amount by which the exponent $X_i$ must be increased to obtain a differential equal to −2. The variable k is set equal to this amount. Line (08) increases the exponent $X_i$ by the amount k. Line (09) sets the differential $\Delta_i$ equal to −2 and line (10) decreases the differential $\Delta_{i+1}$ for the following exponent by the amount k.

If the differential is too large, line (12) sets variable j equal to the current value of index i. Line (13) reiterates the process performed in lines (14) to (18) until encountering a differential which is less than 2 or until the variable becomes equal to zero. Line (14) determines the amount by which the previous exponent $X_{j-1}$ must be increased to obtain a differential equal to 2. The variable k is set equal to this amount. Line (15) increases exponent $X_{j-1}$ by the amount k. Line (16) sets the differential $\Delta_j$ equal to 2 and line (17) increases the differential Aid for the previous exponent by the amount k. Line (18) decrements the variable j to point to the previous differential and exponent.

The logic shown in lines (13) to (19) may be further refined. Line (15) will adjust the value of exponent $X_0$ if the differential $\Delta_1$ between exponents $X_0$ and $X_1$ is too large, but line (17) need not attempt to adjust the value of differential $\Delta_0$ because this differential is not defined.

Restricting exponent differentials may reduce the number of bits required to convey the differentials, but it also may increase the number of bits required to convey mantissas with a given level of accuracy. Referring to the example discussed above, by adjusting the exponent of $Q_2$ from 8 to 4, the number of bits required to express the mantissa with the same accuracy increases by four. Restricting the differential to the range from −1 to 1 saves two bits to convey the differential, but four additional bits are required to convey associated mantissas with the same accuracy.

Figure 7:
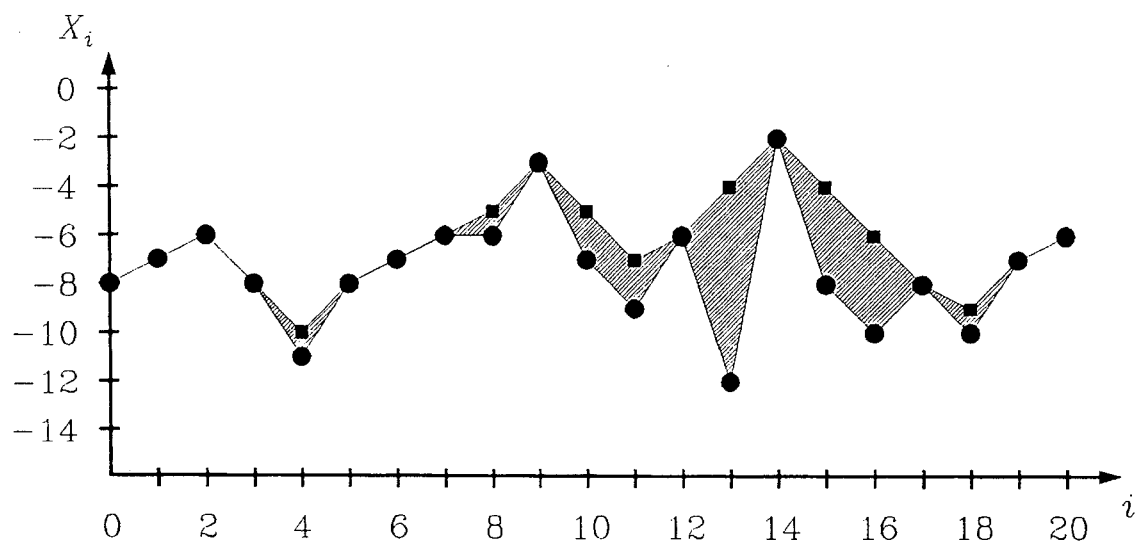
FIGS. 7–10 are hypothetical graphical representations of scaling factors and corresponding adjusted values according to various differential coding modes.

The graphical illustration in FIG. 7, which is similar to that in FIG. 6, shows the results of adjusting exponents to restrict differentials to the range from −2 to 2. The circles represent the values of the exponents before adjustment and the squares represent the values of the modified exponents after adjustment. Although the broken line connecting the circles is a more accurate representation of the spectral envelope than is the broken line connecting the squares, fewer bits are required to convey the restricted differentials of the adjusted exponents. By using a conventional binary representation, for example, four bits are required to represent each unadjusted exponent but only three bits are required to represent each restricted differential for the adjusted exponents. This results in a savings of 20 bits for the twenty exponents.

It is worthwhile to note one characteristic of the frequency response of digital filter banks implemented by discrete transforms. As a general rule which is dependent upon the design of the analysis-window, transform-based filters can achieve a narrow main lobe at the expense of high side lobes which allow a significant amount of spectral energy to leak into neighboring filter bands. See Harris, "On the Use of Windows for Harmonic Analysis with the Discrete Fourier Transform," *Proc. IEEE*, vol. 66, January 1978, pp. 51–83. Because of this side-lobe leakage, part of the spectral energy which exists only at the frequency represented by one transform coefficient will leak into adjacent transform coefficients; the neighboring transform coefficients will indicate falsely that spectral energy exists at their respective frequencies.

One consequence of side-lobe leakage is a limit which is imposed upon the rate at which spectral energy can change between transform coefficients. Because of this limitation, the magnitude of scaling factor differentials is inherently restricted. In other words, because of filter bank side-lobe leakage, very few if any large adjustments will need to be made to the scaling factors to restrict the range of scaling factor differentials.

The shaded area illustrated in FIG. 7 between the two broken lines is a rough measure of the additional bits required to convey floating-point mantissas associated with the adjusted exponents with the same level of accuracy as that conveyed by mantissas associated with the exponents before adjustment. For example, one additional bit is required for each mantissa associated with exponent $X_3$ and three additional bits are required for each mantissa associated with exponent $X_4$. The sum of the differences between the adjusted and respective unadjusted exponents for the example shown in FIG. 7 is equal to 23. Assuming each exponent is associated with one mantissa, this means that 23 additional bits are required to convey all of the mantissas using the adjusted exponents; however, because only 20 bits are saved by restricting the differentials to the range from −2 to 2, the twenty floating-point numbers comprising an exponent and mantissa may be conveyed with a given level of accuracy using 3 fewer bits than is required to convey the numbers using the restricted differentials.

This mode of differential coding is referred to herein as D15. The one indicates that one scaled value is associated with one scaling factor. The five indicates that the scaling factor differentials are restricted so that they may assume one of only five states. In this example, the five states are the five integers in the range from −2 to 2.

In this example, the D15 coding mode is not able to achieve a reduction in information requirements because the number of bits saved to convey the restricted differentials is less than the number of additional bits required to preserve mantissa accuracy. Eighty bits are required to convey twenty 4-bit exponents. A block-by-block figure of merit for the D15 mode of coding the exponents shown in FIG. 5, as well as for the other coding modes discussed below, is expressed in terms of the net number of bits saved relative to the number of bits required to code twenty floating-point numbers comprising 4-bit exponents.

Figure 8:
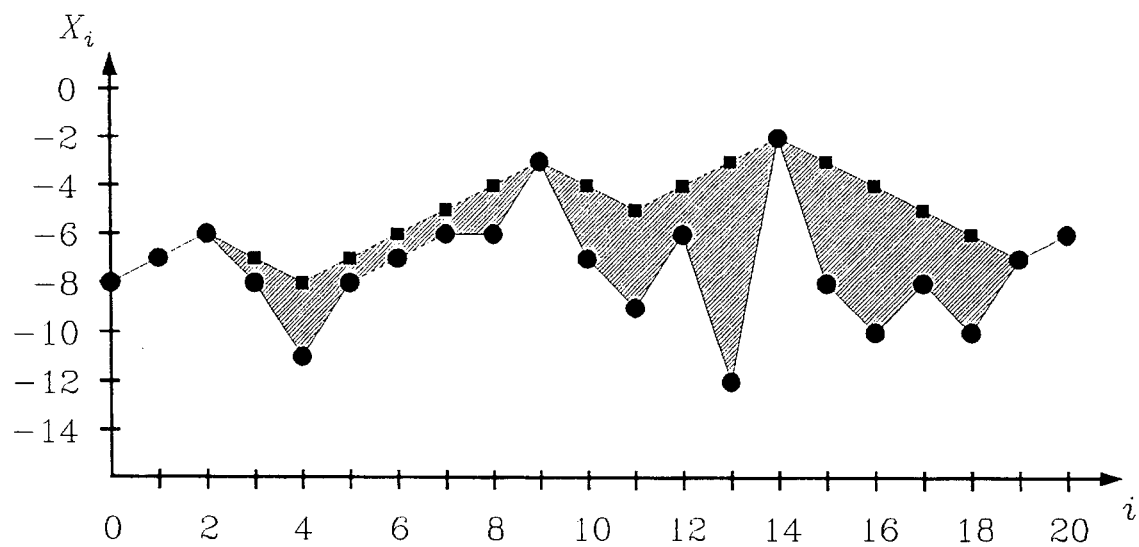

FIG. 8 is a graphical illustration similar to that shown in FIG. 7. The squares represent adjusted exponent values which restrict differentials to the range from −1 to 1. Only two bits are required to convey each differential in a conventional binary representation; therefore, these adjustments result in a savings of 40 bits to convey twenty restricted differentials as compared to twenty exponents. The sum of the differences between the adjusted and respective unadjusted exponents for the example shown in FIG. 8 is equal to 45. Assuming each exponent is associated with one mantissa, restricting the differentials to the range from −1 to 1 allows the twenty floating-point numbers to be conveyed with a given level of accuracy using 5 fewer bits than is required to convey the numbers using the restricted differentials. This mode of differential coding is referred to herein as D13 because the scaling factor differentials are restricted to three states.

Each of the two examples discussed above restrict exponent differentials to a range which is symmetric about zero, but asymmetric ranges may also be used. For example, a four-state D14 coding mode could restrict differentials to the range from −1 to 2. A D15 coding mode could restrict differentials to the range from −1 to 3. If asymmetric ranges are used in audio coding systems, for example, it is generally preferable to allow for larger positive differentials because most audio signals comprise larger and more rapid increases in amplitude than decreases, and because coding errors are more tolerable for large decreases in amplitude rather than large increases due to temporal psychoacoustic masking effects.

Differential Code Packing

Generally, a conventional binary representation is not an efficient way to convey differentials. For example, as mentioned above, differentials which are limited to the range from −1 to 1 can be conveyed by a conventional binary representation of only two bits; however, this representation is inefficient. The range from −1 to 1 comprises only the three distinct integer values −1, 0 and 1, but two binary bits are capable of expressing four distinct integer values. In effect, a fractional part of a bit is wasted if two bits are used to convey a differential which can assume only one of three values. Fractional bits can be reclaimed by packing multiple differentials together.

One example of how this may be done is to first apply to each differential a mapping function M(i) which maps each possible differential value to an integer within the range from 0 to N−1, and then to perform the packing operation by computing the polynomial $$P = M(1) + M(2) \cdot N + \ldots + M(n) \cdot N^{n-1} = \sum_{i=1}^{n} M(i) \cdot N^{i-1}$$

where M(i)=the mapped value of differential $\Delta i$,

N=the number of states each differential may assume, and n=the number of scaling factors to pack.

A simple mapping function M(i) for differentials which may assume any integer value within a range of N consecutive integers is $$M(i) = \Delta_i - \Delta_{min}$$

where $\Delta_{min}$ minimum value a differential may assume.

The ability to pack differentials into a more efficient representation helps make the restriction of differential range more attractive. For example, a five-state differential with a range from −2 to 2 may be mapped into the range 0 to 4 by the mapping function $M(i)=\Delta_i-(-2)=\Delta_i+2$. Three mapped values can be packed into a 7-bit binary representation P by calculating the polynomial P=M(1)+5M(2)+25M(3). As a result, each five-state differential can be conveyed by approximately 2.33 bits. Referring to the example illustrated in FIG. 7, approximately 46.67 bits are required to convey twenty packed differentials using the D15 coding mode as opposed to 80 bits which are required to convey the exponents themselves, but 23 additional bits are required to preserve mantissa accuracy. As a result, D15 coding with code packing achieves a net savings of approximately 10.33 bits over that required to convey twenty exponents and associated mantissas.

A three-state differential with a range from −1 to 1 may be mapped into the range 0 to 2 by the mapping function $M(i)=\Delta_i-(-1)=\Delta_i+1$. Three mapped values can be packed into a 5-bit binary representation P by calculating the polynomial P=M(1)+3M(2)+9M(3). As a result, each three-state differential can be conveyed by approximately 1.67 bits. Referring to the example illustrated in FIG. 8, approximately 33.33 bits are required to convey twenty packed differentials using the D13 coding mode as opposed to 80 bits which are required to convey the exponents themselves, but 45 additional bits are required to preserve mantissa accuracy. As a result, D13 coding with code packing achieves a net savings of approximately 1.67 bits.

For this particular example, the D15 coding mode is able to reduce the information requirements to a greater extent than the D13 coding mode. This will not be true in all instances. Within certain limits, a "lower" differential coding mode such as D13 will be more effective in reducing information requirements than a "higher" mode such as D15 for signals having flatter spectral shapes.

Any number of differentials may be packed by using a polynomial of appropriate length, but a three-term polynomial was used for each of the previous examples because the packing is reasonably efficient. Although packing efficiency will tend to increase as the number of polynomial terms increases, the number of terms is restricted in practical embodiments because the resulting packed representation would otherwise become excessively long and more difficult to process. The following discussion of various embodiments assumes that a three-term polynomial is used.

Code packing in general is not perfectly efficient. For example, the 7-bit representation of three 5-state differentials is only about 98% efficient because only 125 of the 128 total possible states that can be represented by 7 bits are needed to convey the three differentials. The remaining 3 "unused" states are wasted unless they are used for something else. For example, these unused states may be used to represent scaling factor differentials which fall outside the restricted range but which occur frequently enough to deserve special treatment. Several other uses for these otherwise unused states are suggested below.

Block Scaling

Figure 9:
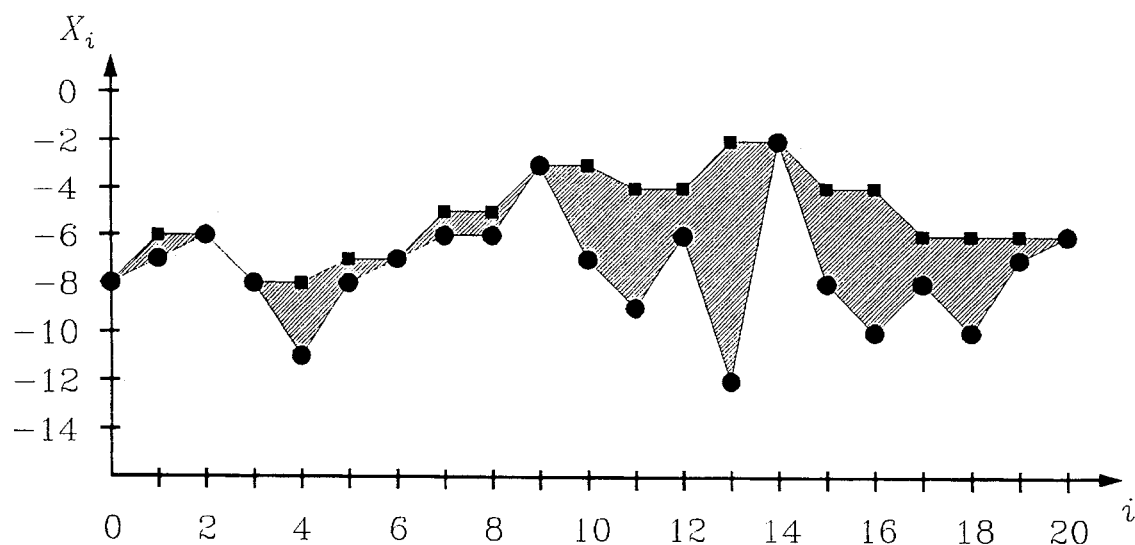
Figure 10:
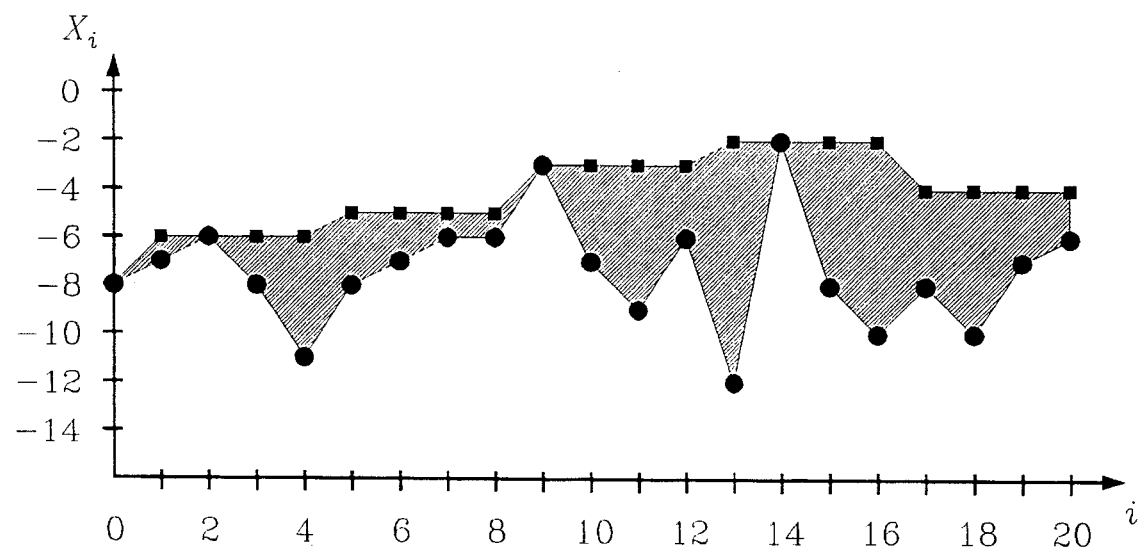

Block scaling techniques may sometimes be used to further reduce information requirements of the encoded signal. FIGS. 9 and 10, which are similar to FIGS. 7, illustrate the effects of one example of block scaling upon differential coding. The squares represent adjusted exponent values which restrict differentials to the range from −2 to 2, but the values of adjusted exponents are further constrained to equal the largest exponent in a block. Because the exponents in each block are equal, information requirements can be reduced by encoding only one exponent from each block.

In FIG. 9, the exponents are grouped into blocks of two exponents. Although the differential for the unadjusted exponent $X_1$ is within the allowed range, exponent $X_1$ is adjusted so that it is equal to exponent $X_2$ which is the largest exponent in the block. Similarly, exponent $X_{10}$ is adjusted to equal exponent $X_9$. This differential coding is one example of a mode of coding referred to herein as D25. The two indicates that two scaled values are associated with each scaling factor. The five indicates that the scaling factor differentials are restricted so that they may assume one of only five states.

By packing the five-state differentials as discussed above, three differentials can be conveyed in 7 bits. Because only ten differentials are coded, approximately 23.33 bits can convey the differentials using the D25 coding mode. By referring to the shaded area in FIG. 9, however, it can be determined that 45 additional bits are required to preserve mantissa accuracy. As a result, D25 coding with code packing achieves a net savings of approximately 11.67 bits.

In FIG. 10, the exponents are grouped into blocks of four exponents. This differential coding is one example of a mode of coding referred to herein as D45. The four indicates that four scaled values are associated with each scaling factor. Because only five differentials are coded, approximately 11.67 bits can convey the differentials using the D45 coding mode with code packing. By referring to the shaded area in FIG. 10, however, it can be determined that 67 additional bits are required to preserve mantissa accuracy. As a result, D45 coding achieves a net savings of approximately 1.33 bits.

For this particular example, the D25 coding mode is able to reduce the information requirements to a greater extent than either the D13, the D15 or the D45 coding modes. This will not be true in all instances. In certain situations, the D45 coding mode can reduce information requirements more than can the other coding modes. In other situations, no form of differential coding can reduce information requirements below that achieved by individual scaling. Within certain limits, for signals having flatter spectral shapes, a "broader" differential coding mode such as D45 will be more effective in reducing information requirements of an encoded signal than a "narrower" coding mode such as D15.

Many variations in the block scaling technique described above are possible. For example, the D25 coding mode may use a five-state mapping function M(i) for a pair of exponent differentials $\Delta_i$ and $\Delta_{i+1}$ such as that shown in Table I.

TABLE I

| M(i) | $\Delta_i$ | $\Delta_{i+1}$ |
|---|---|---|
| 4 | +1 | +1 |
| 3 | +1 | 0 |
| 2 | 0 | 0 |
| 1 | −1 | 0 |
| 0 | −1 | −1 |

The D45 coding mode may use a five-state mapping function M(i) for four exponent differentials $\Delta_i$ to $\Delta_{i+3}$ such as that shown in Table II.

TABLE II

| M(i) | $\Delta_i$ | $\Delta_{i+1}$ | $\Delta_{i+2}$ | $\Delta_{i+3}$ |
|---|---|---|---|---|
| 4 | +1 | 0 | +1 | 0 |
| 3 | +1 | 0 | 0 | 0 |
| 2 | 0 | 0 | 0 | 0 |
| 1 | −1 | 0 | 0 | 0 |
| 0 | −1 | 0 | −1 | 0 |

The choice of the mapping function may have significant effects upon coding performance, but the choice is not critical to practicing the concepts of the present invention.

Spectral Envelope Resolution

Some embodiments of split-band coding systems control quantizing noise by adaptively allocating bits to subband signals based upon block scaling factors. In a transform coding system, for example, transform coefficients are grouped into subbands and all coefficients within a subband are allocated the same number of bits based upon the magnitude of the largest coefficient within the subband. In a subband coding system, each sample in a subband signal is allocated the same number of bits based upon the amplitude of the subband signal.

Figure 11:
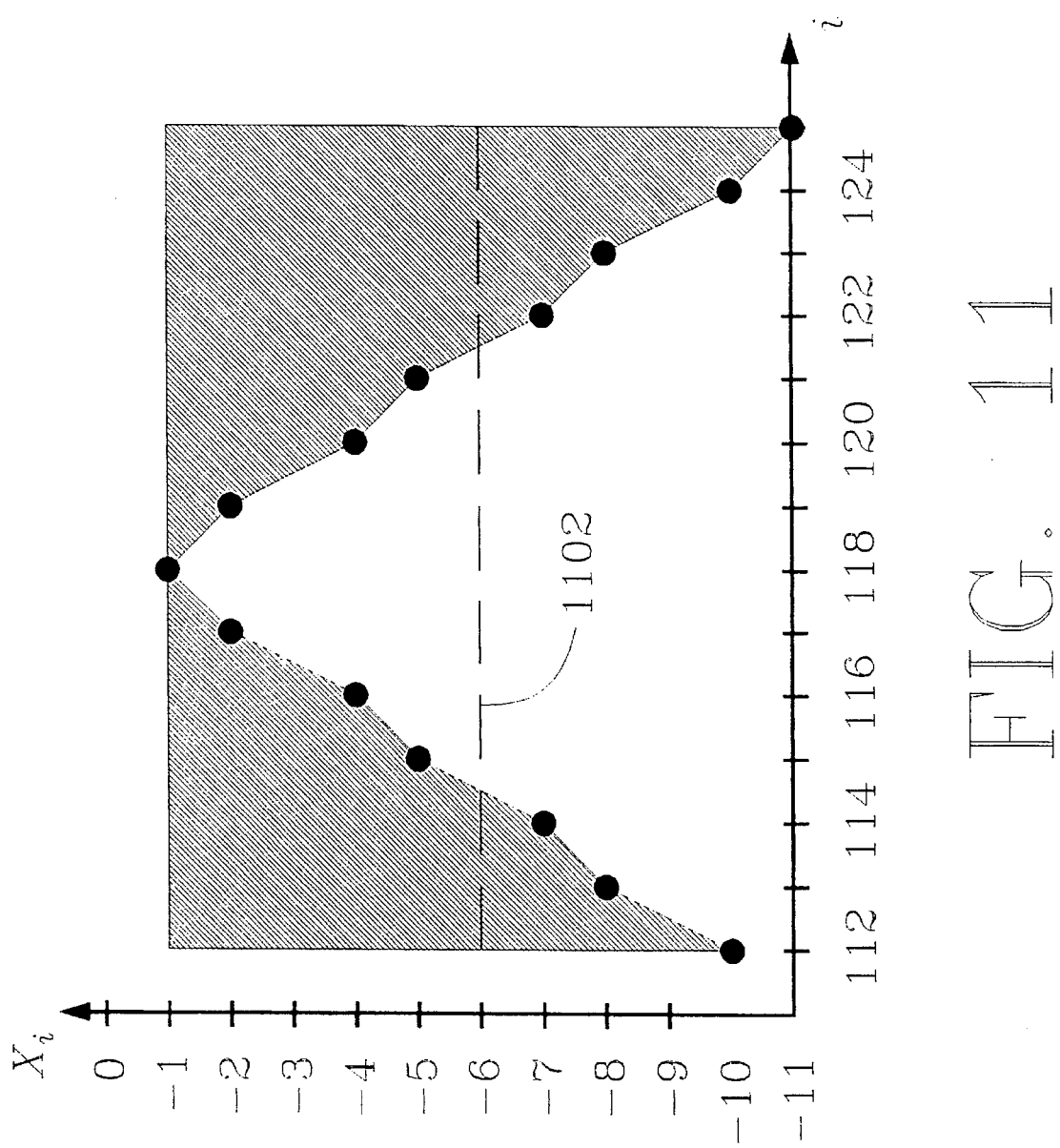
FIG. 11 is a hypothetical graphical representation of subband signal components illustrating some effects of block scaling.

FIG. 11 illustrates a hypothetical example of subband signal components resulting from a transform filter bank in which the circles represent individual scaling factors for each transform coefficient. For ease of discussing the following examples, the scaling factors are assumed to be 4-bit exponents in the floating-point representation discussed above.

In one embodiment of a transform coding system using block scaling, exponent $X_{118}$, which is associated with the largest magnitude component $Q_{118}$ in the illustrated subband, is the block scaling factor. In response to the value of the block scaling factor, an allocation function establishes a masking threshold 1102 which is approximately 30 dB below the amplitude of the quantity $Q_{118}$. Quantizing noise below this threshold is considered to be masked by the spectral energy within the subband. Using a simple 6 dB per bit rule, the allocation function allocates six bits to each of the fourteen components in the subband. One of the six bits represents the sign of the quantity and the remaining five bits represent the magnitude of the quantity in two's complement form.

For example, assume that quantity $Q_{116}$=0.03125 which may be expressed as the floating-point number +0.1$_2$ E 4. By using exponent $X_{118}$ as a block scaling factor and allocating six bits to the mantissa, quantity $Q_{116}$ may be expressed as +0.00010 E 1. The mantissa is not normalized, that is, it has a magnitude less than 0.5, because it is rescaled relative to the block scaling factor $X_{118}$. Because the $Q_{116}$ mantissa is not normalized, the signal-to-noise ratio (SNR) between quantity $Q_{116}$ and the quantizing noise resulting from the allocation is only about 12 dB even though six bits are allocated to the mantissa. In spite of this reduced SNR, the quantizing noise is not audible because it is still under the masking threshold 1102.

It is apparent, however, that the bit allocation is not as efficient as it could be. Although six bits are allocated to the mantissa, a normalized mantissa for $Q_{116}$ requires only three bits to achieve the 12 dB SNR necessary to mask the quantizing noise. Three of the bits allocated to the $Q_{116}$ mantissa are not needed if the mantissa can be coded in normalized form, but this requires individual scaling. From this example, it can be seen that the information requirements of an encoded signal may be reduced by balancing the number of bits required to code individual scaling factors against the number of bits saved by more precise allocation to normalized mantissas.

Referring to FIG. 11, the distance between the top of the shaded area and a point on the broken line along the bottom of the shaded area represents the number of mantissa bits which can be saved by coding normalized mantissas. For example, ten additional bits are required to code the $Q_{112}$ mantissa when it is scaled relative to the block scaling factor $X_{118}$ as opposed to the number of bits required to code the $Q_{112}$ mantissa when it is scaled relative to an individual scaling factor $X_{112}$.

It is also apparent that spectral components with exponents below threshold 1102 do not need to be coded because they will not be audible. The spectral energy they represent will be masked by other spectral energy within the subband. For the example shown in FIG. 11, the mantissas associated with the quantities $Q_{112}$ to $Q_{114}$ and $Q_{122}$ to $Q_{125}$ do not need to be allocated any bits. This results in a further reduction in the information requirements of the encoded signal.

Referring again to the example illustrated in FIG. 11, an encoder which uses block scaling, five-state differential coding and the code packing discussed above will require approximately 2.33 bits to convey the block scaling factor and 84 bits to convey the fourteen 6-bit mantissas, for a total of approximately 86.33 bits. In contrast, an encoder which uses individual scaling, five-state differential coding and the code packing above will require approximately 32.67 bits to convey fourteen exponent differentials and 26 bits to convey the mantissas for the seven quantities above the masking threshold, for a total of approximately 58.67 bits. The use of a higher-resolution spectral envelope realizes a net savings of approximately 27.67 bits for this particular subband signal.

Although the illustration in FIG. 11 and the discussion of spectral envelope resolution are directed more particularly toward transform coding systems, the principles also apply to subband coding systems. In general, the resolution of the spectral envelope is controlled by the bandwidth of the individual filters in the subband filter bank. Block scaling factors can be applied to subband signals which downsample to multiple points, and individual scaling factors can be applied to subband signals which downsample to single points. These scaling factors can provide an estimate of the spectral envelope.

Scaling Factor Reuse

An encoder can sometimes reduce the information requirements of the encoded signal by using scaling factors already known to the decoder. One simple way in which this may be done is to encode subband signals using a set of scaling factors which was generated earlier, and pass in the encoded signal an indication to the decoder that it is to reuse the earlier set of scaling factors. A set of scaling factors from any number of previous sets of scaling factors can be reused but the number is usually limited by practical considerations such as the amount of memory available to the encoder and decoder to store these sets, the information capacity available in the encoded signal to convey which scaling factors in which of the previous sets are to be reused, and the amount of processing required by the encoder to select from the sets.

Scaling factor reuse may not reduce informational requirements if the earlier scaling factors are significantly different from the current scaling factors. This situation is essentially the same as that discussed above for adjusting exponents to restrict the range of differentials. The graphical illustration in FIG. 7, for example, may be interpreted to represent the current scaling factors with the circles and to represent the earlier scaling factors with the squares. The difference between the two sets of scaling factors represents the need for additional bits to preserve the accuracy of the scaled values when reusing the earlier scaling factors.

In one embodiment, the reuse indicator is a single bit which is always present in the encoded signal. When set to one, it indicates that new scaling factors are not present in the encoded signal and that the previous set of scaling factors is to be used by the decoder. The encoder decides for each subband signal block whether to reuse the previous set of scaling factors. Scaling factors are reused whenever the number of additional bits required to preserve scaled value accuracy is less than the number of bits required to convey the current scaling factors and/or their differentials.

Figure 13:
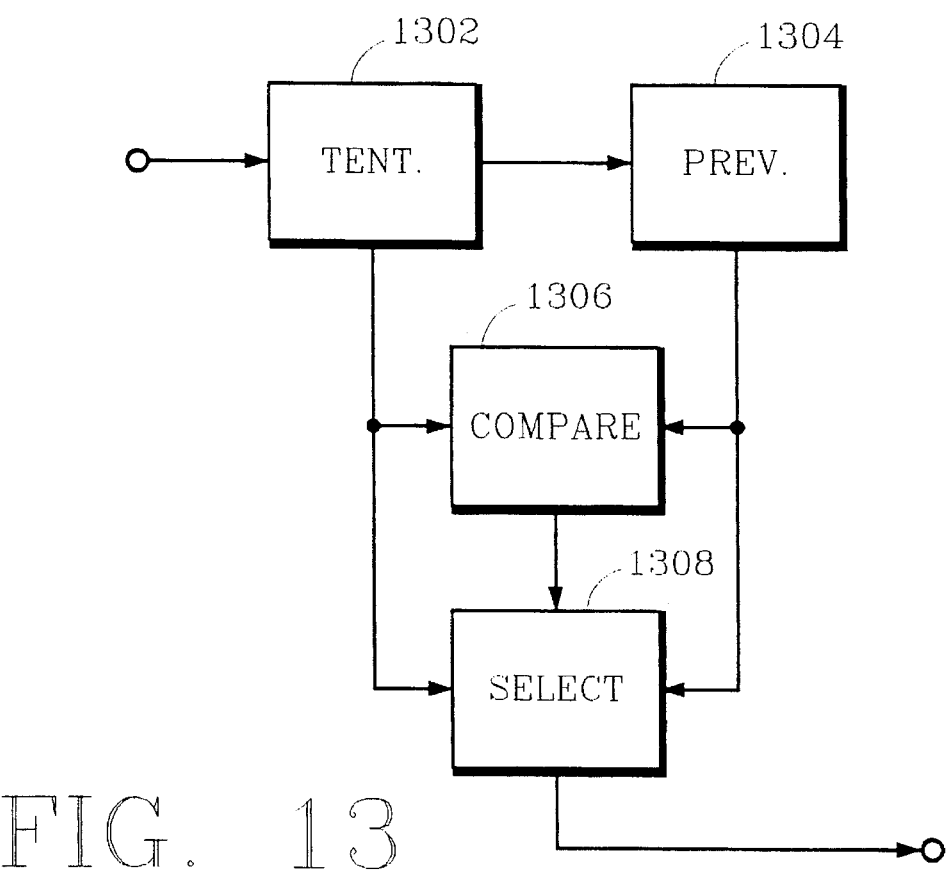
FIG. 13 is a block diagram illustrating one embodiment of a portion of a scaler which permits scaling factor reuse.

FIG. 13 illustrates in functional form one embodiment of a portion of scaler 104 which permits scaling factor reuse. Tent. 1302 generates a set of tentative scaling factors for a "current" subband signal block. Prev. 1304 stores a set of scaling factors generated for a "previous" subband signal block. Compare 1306 compares the results of using the tentative and previous sets of scaling factors to generate scaled representations of the current subband signal block and passes the results of the comparison to select 1308. Select 1308 selects the set of scaling factors which allows encoding using fewer bits, or allows higher-quality coding using a given number of bits.

Referring to the D15 coding example in FIG. 7, an additional 23 bits are required to preserve mantissa accuracy but approximately 46.67 bits are saved by reusing earlier scaling factors. For the D13 coding example in FIG. 8, an additional 45 bits are required to preserve mantissa accuracy and only about 33.33 bits are saved by reusing the earlier scaling factors. For the D25 coding example in FIG. 9, an additional 45 bits are required to preserve mantissa accuracy and only about 23.33 bits are saved by reusing the earlier scaling factors. For the D45 coding example in FIG. 9, an additional 67 bits are required to preserve mantissa accuracy and only about 11.67 bits are saved by reusing the earlier scaling factors.

A broader coding mode may also reuse scaling factors previously generated for a narrower coding mode. For example, a D45 mode of coding may use a set of scaling factors previously used for D15 coding by selecting, for example, every fourth scaling factor in the set.

An encoder may also maximize scaling factor reuse by "looking ahead." In one embodiment, an encoder examines a frame of two or more subband signal blocks and establishes a set of scaling actors which can be used to code a majority of blocks in the frame. A set of "frame scaling factors" which best represents all or most of the blocks in the frame is encoded once in the frame and reused for blocks occurring later in the frame. An isolated block in the frame which is not well represented by the frame scaling factors can be encoded using a special set of scaling factors. The isolated block also contains an indication that its scaling factors are to be used perhaps only one time, and that the frame scaling factors are to be used for subsequent blocks.

Figure 14:
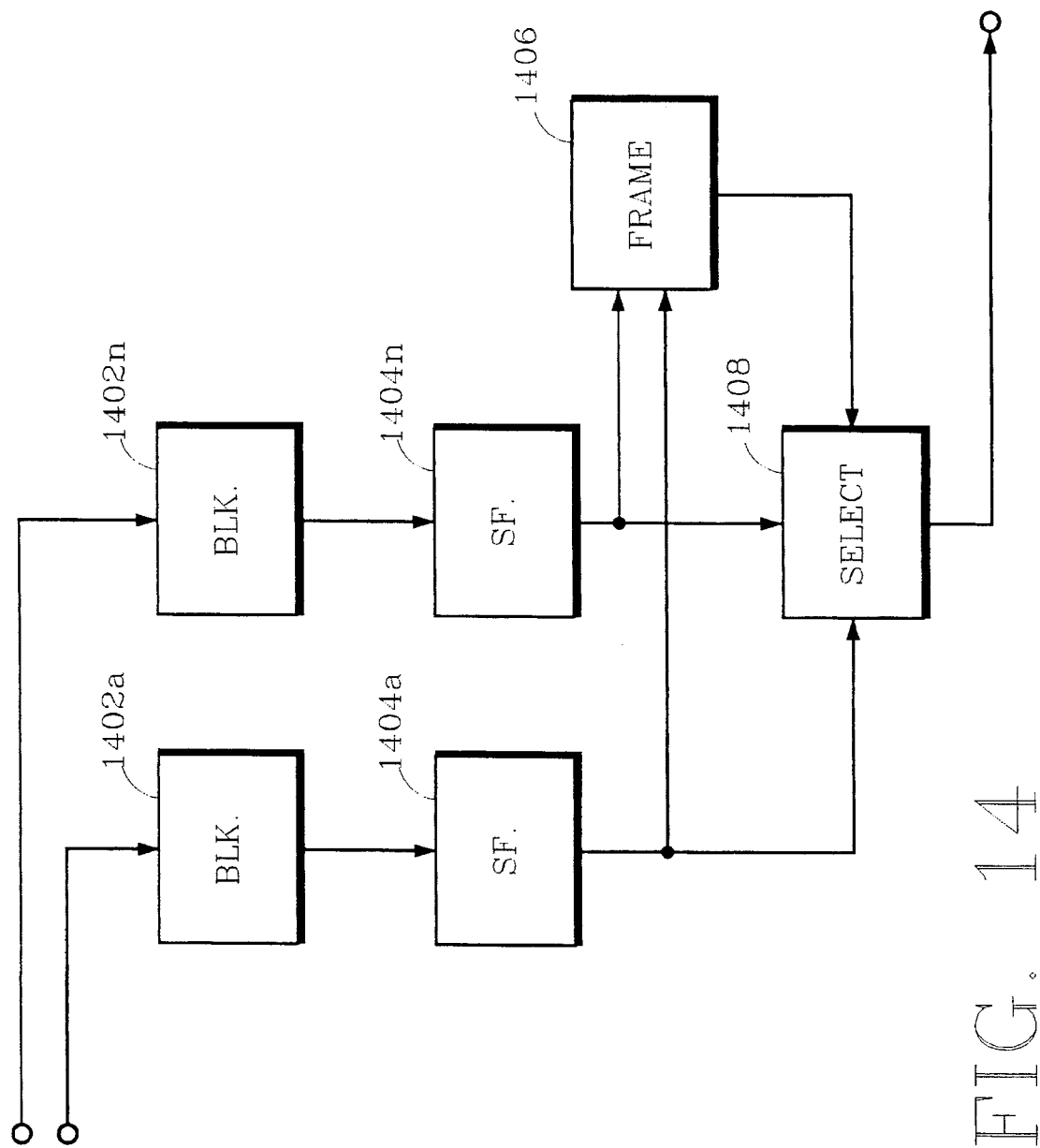
FIG. 14 is a block diagram illustrating one embodiment of a portion of a scaler which permits scaling factor reuse across multiple subband signal blocks.

FIG. 14 illustrates in functional form one embodiment of a portion of scaler 104 which permits scaling factor reuse with look ahead. Blk 1402a through Blk 1402n each represent the generation of a respective subband signal block. SF 1404a through SF 1404n each represent the generation of a tentative set of scaling factors for a respective subband signal block. Frame 1406 analyzes the sets of tentative scaling factors and generates the set of frame scaling factors. Select 1408 selects, for each subband signal block, either the respective tentative set of scaling factors or the frame set of scaling factors, according to which set allows encoding using fewer bits, or allows higher-quality coding using a given number of bits.

One simple technique which establishes frame scaling factors comprises calculating the scaling factor for each subband signal in each block in the frame, determining the value of the largest scaling factor for each respective subband across all the blocks in the frame, and constructing a set which comprises these largest scaling factors. The blocks which are to be coded using a respective set of tentative scaling factors rather than the frame scaling factors are identified by using a block-by-block figure of merit similar to that discussed above.

Differential Coding of Selected Subbands

An encoder may be able to reduce information requirements of an encoded signal by applying various coding methods to selected subbands. For example, an encoder may apply D25 coding to a relatively flat portion of the spectrum, apply D15 coding to a portion of the spectrum which is not as flat, not apply any differential coding for a portion of the spectrum in which the differentials are very large, and indicate the reuse of an earlier set of scaling factors for another portion of the spectrum. An "unused" state, for example, may be used with code packing to indicate a switch from one coding mode to another.

Practical considerations entail trading the potential net reduction in the information requirement of the encoded signal with the increase in information requirements to convey the indication for these selections and the cost of the processing to make the selections.

In one embodiment, an encoder selects a frequency above which all exponents are encoded using the D45 coding mode. Below this frequency, either the D15 or the D25 coding mode is used. An indication of the cutoff frequency and the coding mode selected for the lower frequencies is included in the encoded signal.

Other Features

The present invention may be used in embodiments of coding system which adapt the length of the subband signal block in response to various events such as signal transients. For example, WIPO publication WO 91/16769, published Oct. 31, 1991, which is incorporated by reference herein in its entirety, discloses a coding system using the TDAC filter bank of Princen and Bradley which may switch to a shorter block length in response to the occurrence of a transient in the input signal. No special considerations are necessary to incorporate the present invention into such coding systems, but various practical considerations may be pertinent.

For example, in one particular embodiment of a low bit-rate 20 kHz bandwidth coding system which adaptively switches between a 512-point block and a 256-point block, the D15 coding mode is not used to code the shorter subband signal blocks but the D25 and the D45 modes are used as desired. The reason for this is that generally not enough bits are available to code a shorter block using the D15 mode.

The present invention may also be used in embodiments of multi-channel coding systems which control the information requirements of the encoded signal by adaptively combining two or more channels into a composite representation. For example, WIPO publication WO 92/12607, published Jul. 23, 1992, which is incorporated by reference herein in its entirety, discloses such a coding system for multiple channels of audio information. No special considerations are necessary to incorporate the present invention into such coding systems.

In one embodiment of a multi-channel split-band encoder, only high-frequency subband signals representing two or more of the channels are combined into a composite representation. Differential coding of subband signal scaling factors is applied to the combined representation but not to the individual low-frequency subband signals.

Various considerations may depend upon the needs of a particular coding application but they do not represent any limitation upon how the present invention may be used.

Switching Criteria

An encoder can sometimes further reduce the information requirements of an encoded signal by first determining the information requirements of the encoded signal which results from the use of various coding modes, and then adaptively switching to the mode which achieves the greatest reduction.

Many alternative switching functions are available. For example, a switching function may base a decision to switch between modes upon a measure of spectral shape. Lower coding modes such as D13 as opposed to D15, and broader coding modes such as D45 as opposed to D15, are generally more efficient for coding signals with flatter spectral characteristics. One possible measure is the basic block-by-block figure of merit discussed above. Another measure is the Spectral Flatness Measure (SFM) described by Jayant and Noll, *Digital Coding of Waveforms*, Englewood Cliffs, N.J., 1984, pp. 56–58. The SFM describes the shape of a signal's power spectral density by a single number which ranges in value from 0 to 1. The SFM is inversely proportional to waveform predictability. A value of 1 describes an unpredictable signal with the properties of white noise. A value of zero describes a signal which is perfectly predictable. One embodiment of an encoder incorporating various aspects of the present invention adaptively switches to progressively broader coding modes as the SFM falls below progressively lower thresholds.

As another example, the switching decision may be based upon a longer-term average of a measure F(k) such as SFM or a measure such as the block-by-block figure of merit discussed earlier. An average may be obtained by applying a low-pass filter to the measure. For example, an exponentially decaying average of the calculated measure F(k) can be obtained from a simple IIR filter such as $$A(k)=\{F(k)-A(k-1)\}\cdot E+A(k-1)$$

where

A(k)=filtered average for iteration k, and

E=filter time constant. The time constant of the filter is chosen to balance response time with stability of response across short-term conditions.

The features of the alternative embodiments discussed above may be combined in various ways and incorporated into a single embodiment. Features may also be applied selectively, either adaptively in response to signal characteristics, for example, or in an invariant manner. For example, different differential coding modes may be applied to selected subbands in response to input signal spectral shape, or they may be applied in an invariant manner based upon empirical evidence of signal characteristics. The manner in which selective application is accomplished does not limit the scope of the present invention.

I claim:

1. An encoder of one or more channels of input signals comprising signal samples, said encoder comprising splitband means for generating a subband signal block comprising a plurality of subband signals by applying a filter bank to said channels of input signals, each subband signal representing a respective frequency subband of said channels of input signals, scaling means for generating scaled representations of two or more subband signals, each of said scaled representations comprising a scaling factor associated with one or more scaled values, wherein said scaling means comprises means for adjusting the value of said scaling factor and said scaled values in a respective one of said scaled representations to restrict the magnitude of a difference between said scaling factor and a scaling factor in another or said scaled representations in accordance with frequency selectivity characteristics of said filter bank, differentiating means for generating differential coded representations of one or more of said scaling factors, and formatting means for generating an encoded signal comprising said scaled values and said differential coded representations.

2. An encoder according to claim 1 wherein said filter bank is implemented by one or more discrete transforms.

3. An encoder according to claim 1 wherein said filter bank is implemented by a bank of digital band-pass filters.

4. An encoder according to claim 1 wherein each of said subband signals represents a respective frequency subband of a respective one of said channels of input signals.

5. An encoder of two or more channels of input signals according to claim 1 wherein at least one of said subband signals represents a composite of a respective frequency subband of two or more of said channels of input signals.

6. An encoder according to claim 1 wherein each scaling factor is associated with a single scaled value.

7. An encoder according to claim 1 further comprising means for determining the information requirements of said encoded signal which results from the use of various coding modes, and then adaptively switching to the mode which achieves the greatest reduction in information requirements, said coding modes including various ranges to restrict said magnitude and various numbers of scaled values associated with a respective scale factor.

8. An encoder according to claim 1 wherein said scaling means comprises means for generating a tentative set of scaling factors corresponding to subband signals in said subband signal block, means for storing a previous set of scaling factors, means for comparing results from using the scaling factors in said tentative set with results from using respective scaling factors in said previous set to generate scaled representations, and means for selecting scaling factors from said previous set whenever the use of respective scaling factors in said tentative set results in higher information requirements for said encoded signal and/or the coding quality of said encoded signal is lower than is achieved by the use of scaling factors selected from said previous set, otherwise selecting scaling factors from said tentative set, wherein said scaling means generates said scaled representations using said selected scaling factors, and wherein said encoded signal comprises an indication of which scaling factors are selected from said previous set.

9. An encoder according to claim 1 wherein said splitband means further comprises means for generating one or more additional subband signal blocks each comprising a plurality of subband signals by applying a filter bank to said channels of input signals, wherein said subband signal block and said one or more additional subband signal blocks constitute a frame of blocks, wherein said scaling means generates said scaled representations using selected scaling factors, said scaling means comprising means for establishing sets of tentative scaling factors, one set for each block in said frame of blocks, means for analyzing said sets of tentative scaling factors and for establishing a set of frame scaling factors in response thereto, means for comparing, for each block in said frame of blocks, results from using said frame scaling factors with results from using respective tentative scaling factors to generate scaled representations, means for selecting, for each block in said frame of blocks, said frame scaling factors whenever the use of said frame scaling factors results in lower information requirements of said encoded signal and/or the coding quality of said encoded signal is higher, otherwise selecting respective tentative scaling factors, and means for generating said scaled representations using scale factors selected by said means for selecting, and wherein said encoded signal comprises a differential coded representation of respective tentative scaling factors in portions of said encoded signal corresponding to subband signal blocks from which scaled representations were generated using respective tentative scaling factors, a differential coded representation of said frame scaling factors in a portion of said encoded signal corresponding to a block in said frame of blocks from which scaled representations were first generated using said frame scaling factors, and an indication to reuse said frame scaling factors in portions of said encoded signal corresponding to one or more other blocks in said frame of blocks from which scaled representations were generated using said frame scaling factors.

10. An encoder according to claim 1 wherein said scaled representations are floating-point representations comprising exponents and mantissas, said scaling factor corresponding to an exponent and said scaled values corresponding to mantissas.

11. A decoder of an encoded signal generated by an encoder comprising an analysis filter bank, said decoder comprising deformatting means for extracting from said encoded signal one or more scaled values and differential coded representations of one or more scale factors, integrating means for generating scaled representations in response to said one or more scaled values and said differential coded representations, each scaled representation comprising a scaling factor associated with one or more scaled values, wherein each differential coded representation represents a difference between a respective scaling factor and a base value or another scaling factor and said integrating means is limited to integrating differences restricted in accordance with spectral selectivity of said analysis filter bank, inverse scaling means for generating a subband signal block comprising a plurality of subband signals, wherein one or more of said subband signals is generated in response to a respective one of said scaled representations, and inverse splitband means for generating one or more channels of output signals by applying to said subband signal block a signal synthesis filter bank inverse to said signal analysis filter bank.

12. A decoder according to claim 11 wherein said signal synthesis filter bank is implemented by one or more discrete inverse transforms.

13. A decoder according to claim 11 wherein said signal synthesis filter bank is implemented by a bank of digital inverse filters.

14. A decoder according to claim 11 wherein each of said subband signals represents a respective frequency subband of a respective one of said channels of output signals.

15. A decoder according to claim 11 wherein at least one of said subband signals represents a composite of a respective frequency subband of two or more of said channels of output signals.

16. A decoder according to claim 11 wherein said respective scaling factor is associated with a single scaled value.

17. A decoder according to claim 11 further comprising means for adaptively switching to one of a plurality of modes for generating said sealed representations, said modes including various numbers of scaled values associated with a respective scale factor.

18. A decoder according to claim 11 wherein said differential coded representations comprise an indication of scaling factor reuse, and wherein said integrating means comprises means for storing one or more previous sets of scaling factors, and means for incorporating one or more scaling factors from one of said previous sets into said scaled representations in response to said indication of scaling factor reuse.

19. A decoder according to claim 11 wherein said scaled representations are floating-point representations comprising exponents and mantissas, said scaling factor corresponding to an exponent and said scaled values corresponding to mantissas.

20. An encoding method of one or more channels of input signals comprising signal samples, said encoding method comprising generating a subband signal block comprising a plurality of subband signals by applying a filter bank to said channels of input signals, each subband signal representing a respective frequency subband of said channels of input signals, generating scaled representations of two or more subband signals, each of said scaled representations comprising a scaling factor associated with one or more scaled values, wherein said generating scaled representations comprises adjusting the value of said scaling factor and said scaled values in a respective one of said scaled representations to restrict the magnitude of a difference between said scaling factor and a scaling factor in another of said scaled representations in accordance with frequency selectivity characteristics of said filter bank such that information requirements of an encoded signal are reduced, generating differential coded representations of one or more of said scaling factors, and generating an encoded signal comprising said scaled values and said differential coded representations.

21. An encoding method according to claim 20 wherein said filter bank is implemented by one or more discrete transforms.

22. An encoding method according to claim 20 wherein said filter bank is implemented by a bank of digital bandpass filters.

23. An encoding method according to claim 20 wherein each of said subband signals represents a respective frequency subband of a respective one of said channels of input signals.

24. An encoding method of two or more channels of input signals according to claim 20 wherein at least one of said subband signals represents a composite of a respective frequency subband of two or more of said channels of input signals.

25. An encoding method according to claim 20 wherein each scaling factor is associated with a single scaled value.

26. An encoding method according to claim 20 further comprising determining the information requirements of said encoded signal which results from the use of various coding modes, and then adaptively switching to the mode which achieves the greatest reduction in information requirements, said coding modes including various ranges to restrict said magnitude and various numbers of scaled values associated with a respective scale factor.

27. An encoding method according to claim 20 wherein said generating scaled representations comprises generating a tentative set of scaling factors corresponding to subband signals in said subband signal block, storing a previous set of scaling factors, comparing results from using the scaling factors in said tentative set with results from using respective scaling factors in said previous set to generate scaled representations, and selecting scaling factors from said previous set whenever the use of respective scaling factors in said tentative set results in higher information requirements for said encoded signal and/or the coding quality of said encoded signal is lower than is achieved by the use of scaling factors selected from said previous set, otherwise selecting scaling factors from said tentative set, wherein said scaled representations use said selected scaling factors, and wherein said encoded signal comprises an indication of which scaling factors are selected from said previous set.

28. An encoding method according to claim 20 wherein said generating a subband signal block further comprises generating one or more additional subband signal blocks each comprising a plurality of subband signals by applying a filter bank to said channels of input signals, wherein said subband signal block and said one or more additional subband signal blocks constitute a frame of blocks, wherein said generating scaled representations generates said scaled representations using selected scaling factors, said generating comprising establishing sets of tentative scaling factors, one set for each block in said frame of blocks, analyzing said sets of tentative scaling factors and establishing a set of frame scaling factors in response thereto, comparing, for each block in said frame of blocks, results from using said frame scaling factors with results from using respective tentative scaling factors to generate scaled representations, selecting, for each block in said frame of blocks, said frame scaling factors whenever the use of said frame scaling factors results in lower information requirements of said encoded signal and/or the coding quality of said encoded signal is higher, otherwise selecting respective tentative scaling factors, and generating said scaled representations using scale factors selected by said selecting, and wherein said encoded signal comprises a differential coded representation of respective tentative scaling factors in portions of said encoded signal corresponding to subband signal blocks from which scaled representations were generated using respective tentative scaling factors, a differential coded representation of said frame scaling factors in a portion of said encoded signal corresponding to a block in said frame of blocks from which scaled representations were first generated using said frame scaling factors, and an indication to reuse said frame scaling factors in portions of said encoded signal corresponding to one or more other blocks in said frame of blocks from which scaled representations were generated using said frame scaling factors.

29. An encoding method according to claim 20 wherein said scaled representations are floating-point representations comprising exponents and mantissas, said scaling factor corresponding to an exponent and said scaled values corresponding to mantissas.

30. A decoding method for decoding an encoded signal generated by an encoder comprising an analysis filter bank, said decoding method comprising extracting from said encoded signal one or more scaled values and differential coded representations of one or more scale factors, wherein said extracting is limited to extracting differential coded representations in which magnitudes of differentials are restricted in accordance with spectral selectivity of said analysis filter bank, generating scaled representations in response to said one or more scaled values and said differential coded representations, each scaled representation comprising a scaling factor associated with one or more scaled values, wherein each differential coded representation represents a difference between a respective scaling factor and a base value or another scaling factor, generating a subband signal block comprising a plurality of subband signals, wherein one or more of said subband signals is generated in response to a respective one of said scaled representations, and generating one or more channels of output signals by applying to said subband signal block a signal synthesis filter band inverse to said signal analysis filter bank.

31. A decoding method according to claim 30 wherein said signal synthesis filter bank is implemented by one or more discrete inverse transforms.

32. A decoding method according to claim 30 wherein said signal synthesis filter bank is implemented by a bank of digital inverse filters.

33. A decoding method according to claim 30 wherein each of said subband signals represents a respective frequency subband of a respective one of said channels of output signals.

34. A decoding method according to claim 30 wherein at least one of said subband signals represents a composite of a respective frequency subband of two or more of said channels of output signals.

35. A decoding method according to claim 30 wherein said respective scaling factor is associated with a single scaled value.

36. A decoding method according to claim 30 further comprising adaptively switching to one of a plurality of modes for generating said scaled representations, said modes including various numbers of scaled values associated with a respective scale factor.

37. A decoding method according to claim 30 wherein said differential coded representations comprise an indication of scaling factor reuse, and wherein said generating a subband signal block comprises storing one or more previous sets of scaling factors, and incorporating one or more scaling factors from one of said previous sets into said scaled representations in response to said indication of scaling factor reuse.

38. A decoding method according to claim 30 wherein said scaled representations are floating-point representations comprising exponents and mantissas, said scaling factor corresponding to an exponent and said scaled values corresponding to mantissas.

* * * * *

UNITED STATES PATENT AND TRADEMARK OFFICE
CERTIFICATE OF CORRECTION

PATENT NO. : 5,581,653
DATED : December 3, 1996
INVENTOR(S) : Craig Campbell Todd It is certified that error appears in the above-identified patent and that said Letters Patent is hereby corrected as shown below:

Column 7,
Line 35, "Gatand" should be -- Galand --.
Line 38, "CYDAC" should be -- TDAC --.

Column 9,
Line 23, "plated" should be -- plotted --.

Column 13,
Line 24, "Aid" should be -- $\Delta_{j-1}$ --.

Column 25,
Line 7, "sealed" should be -- scaled --.

Column 26,
Line 5, "sealed" should be -- scaled --.

Signed and Sealed this

Eighth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 5,581,653  
APPLICATION NO. : 08/115513  
DATED : December 3, 1996  
INVENTOR(S) : Craig Campbell Todd Page 1 of 1

It is certified that error appears in the above-identified patent and that said Letters Patent is hereby corrected as shown below:

Column 27, line 33, "band" should be --bank--.

Signed and Sealed this

Twentieth Day of October, 2009

David J. Kappos  
*Director of the United States Patent and Trademark Office*